United States Patent
Slayton et al.

(10) Patent No.: US 9,729,592 B2
(45) Date of Patent: Aug. 8, 2017

(54) SYSTEM AND METHOD FOR DISTRIBUTED VIRTUAL ASSISTANT PLATFORMS

(71) Applicant: PERSAIS, LLC, Mesa, AZ (US)

(72) Inventors: Michael H. Slayton, Tempe, AZ (US); Vadim Kouklev, Tempe, AZ (US)

(73) Assignee: PERSAIS, LLC, Phoenix, AZ (US)

( * ) Notice: Subject to any disclaimer, the term of this patent is extended or adjusted under 35 U.S.C. 154(b) by 401 days.

(21) Appl. No.: 14/488,136

(22) Filed: Sep. 16, 2014

(65) Prior Publication Data
US 2015/0215350 A1 Jul. 30, 2015

Related U.S. Application Data

(63) Continuation-in-part of application No. 14/470,678, filed on Aug. 27, 2014, and a continuation-in-part of application No. 14/470,673, filed on Aug. 27, 2014.

(60) Provisional application No. 61/870,751, filed on Aug. 27, 2013, provisional application No. 61/870,754, filed on Aug. 27, 2013, provisional application No. 61/878,429, filed on Sep. 16, 2013.

(51) Int. Cl.
G06F 3/048 (2013.01)
H04L 29/06 (2006.01)
G06F 9/44 (2006.01)

(52) U.S. Cl.
CPC .......... *H04L 65/403* (2013.01); *G06F 9/4446* (2013.01)

(58) Field of Classification Search
CPC ............................ H04L 65/403; G06F 9/4446
USPC ........................................................ 715/708
See application file for complete search history.

(56) References Cited

U.S. PATENT DOCUMENTS

| 6,236,977 | B1 | 5/2001 | Verba et al. |
| 7,450,567 | B1 * | 11/2008 | Mamnani .............. H04L 12/581 370/352 |
| 8,000,453 | B2 | 8/2011 | Cooper et al. |
| 8,271,876 | B2 * | 9/2012 | Brugler ................. G06F 3/0481 715/708 |

(Continued)

OTHER PUBLICATIONS

PCT International Search Report, PCT/US2014/052917, dated Nov. 28, 2014, 4 pages.

(Continued)

*Primary Examiner* — David Phantana Angkool
(74) *Attorney, Agent, or Firm* — Quarles & Brady LLP

(57) ABSTRACT

Virtual assistant systems ("VAs") operate on a distributed and interconnected network, such as a hierarchy or mesh, of virtual assistant platforms ("VAPs"). VAs communicate with a user via an electronic device, and can communicate with other devices, software programs, and other VAs. VAs include intelligent agents configured to perform particular tasks. The VAP includes an execution environment that may provide an interface between the VA and the electronic device, and may further provide a framework of services for implementing, maintaining, and executing the intelligent agents. A VA may be configured to participate in a group VA in which knowledge and tasks can be shared and cooperatively executed. Cooperative execution can include distributing subtasks among VAs in the group VA, the subtasks together forming the task. Group VAs can share information with each other, and may further inter-network by accessing a common network outside the VAP, such as a social network.

20 Claims, 19 Drawing Sheets

(56) References Cited

U.S. PATENT DOCUMENTS

| | | | | |
|---|---|---|---|---|
| 8,448,170 | B2* | 5/2013 | Wipfel | H04L 9/3213 718/1 |
| 9,430,142 | B2* | 8/2016 | Amerige | G06F 3/04883 |
| 2002/0029203 | A1 | 3/2002 | Pelland et al. | |
| 2005/0033582 | A1 | 2/2005 | Gadd et al. | |
| 2005/0091305 | A1* | 4/2005 | Lange | H04L 63/10 709/202 |
| 2005/0135675 | A1* | 6/2005 | Chen | G06T 11/00 382/162 |
| 2006/0092978 | A1 | 5/2006 | John et al. | |
| 2007/0282703 | A1 | 12/2007 | Sharpe et al. | |
| 2009/0018834 | A1 | 1/2009 | Cooper et al. | |
| 2009/0182702 | A1 | 7/2009 | Miller | |
| 2009/0216840 | A1* | 8/2009 | Pajunen | G06F 9/541 709/206 |
| 2010/0309147 | A1* | 12/2010 | Fleizach | G06F 3/04883 345/173 |
| 2012/0022927 | A1 | 1/2012 | Yankovich et al. | |
| 2012/0022959 | A1* | 1/2012 | Yankovich | G06Q 30/0601 705/26.1 |
| 2012/0253791 | A1* | 10/2012 | Heck | G06F 17/30867 704/9 |
| 2012/0265528 | A1* | 10/2012 | Gruber | G10L 15/18 704/235 |
| 2014/0164305 | A1 | 6/2014 | Lynch et al. | |
| 2014/0164953 | A1* | 6/2014 | Lynch | H04L 51/046 715/753 |
| 2017/0090589 | A1* | 3/2017 | Sharma | G06F 3/017 |

OTHER PUBLICATIONS

PCT International Search Report, PCT/US2014/055876, dated Nov. 28, 2014, 3 pages.

* cited by examiner

SYSTEM AND METHOD FOR DISTRIBUTED VIRTUAL ASSISTANT PLATFORMS

CROSS-REFERENCE TO RELATED APPLICATIONS

This application is a continuation-in-part of U.S. patent application Ser. Nos. 14/470,678 and 14/470,673, both filed Aug. 27, 2014, each of which are non-provisionals claiming the benefit of U.S. patent application Ser. Nos. 61/870,751 and 61/870,754, both filed Aug. 27, 2013, and this application is a non-provisional and claims the benefit of U.S. patent application Ser. No. 61/878,429, filed Sep. 16, 2013, all incorporated herein by reference.

BACKGROUND OF THE INVENTION

The subject matter disclosed herein relates generally to intelligent agent communication systems and methods, and, more particularly, to computer-implemented intelligent agent systems and methods that provide electronic assistance to users for completing particular tasks.

Artificial intelligence systems have been implemented in many environments for the purpose of helping a person obtain or manage information. Examples include: an automated online assistant, used to provide customer service or other assistance electronically without the presence of a human agent; electronic bots for searching the internet, performing stock trades or other financial transactions, or simulating crowd responses; an artificial neural network for modeling relationships between inputs and outputs; and an intelligent personal assistant that receives input from a user and performs tasks based on the input in an attempt to produce useful output. One example of the intelligent personal assistant is SIRI by APPLE Inc. SIRI is a software application resident on most APPLE mobile devices that receives natural language input spoken by the user, parses the input, requests feedback from resources, such as dedicated servers or webpages generally available on the internet, and reports the information gained from the dedicated servers or webpages back to the user. Also, SIRI is capable of performing some limited tasks within the capabilities of the mobile device, such as setting an alarm at a specified time or identifying a received message.

In this regard, SIRI is capable of converting text to speech and vice versa, search the internet, answer questions, modify the user's appointment calendar, search for nearby establishments based on the device's location, and perform other similar tasks.

While SIRI has proven to be a useful personal assistant, it is limited to performing only native functions within the APPLE iOS and the device on which it is implemented, including a limited subset of web services. The native functions do not provide assistance for a wide variety of common problems in which a virtual assistant is needed. These problems include management of documents across multiple platforms and formats, management of multiple digital devices, access to cloud storage and processing, and access to knowledge stores for specific topics. Another drawback of SIRI and similar device-specific personal assistants is that the personal assistant software is not expandable or customizable. A user cannot add functionality to SIRI at will.

It would, therefore, be desirable to provide systems and methods that implement a virtual assistant platform for virtual assistants that can provide a more robust and customizable set of functionalities and capabilities.

BRIEF DESCRIPTION OF THE INVENTION

The present invention overcomes the aforementioned drawbacks by providing systems and methods that provide electronic assistance to a user. In particular, a virtual assistant platform is configured to provide shared capabilities to a plurality of virtual assistants, allowing the virtual assistants to communicate with each other and with a variety of external services (web, software or hardware based), share data, learn from users, teach users using knowledge learned, and improve the knowledge and rules available to one or more of the platforms. The virtual assistant platforms can be organized in a network of different topologies to privatize and personalize the functions of a particular virtual assistant for its associated user, while also allowing the user to interface with groups and networks that are accessible by other users through virtual assistants. The user can access an agent store to download or stream additional specially-configured virtual assistants or agents and associated data to perform desired tasks or otherwise add desired functionality to the virtual assistant platform.

In accordance with one embodiment of the invention, a method is provided for providing electronic assistance to a user. The method comprises providing a virtual assistant platform configured to share data across a plurality of virtual assistants, activating an agent in one of the virtual assistants, the agent located on a device client installed on a device of the user, and the agent being configured to perform one or more tasks, and activating an agent in the same or another of the virtual assistants, the agent not located on the device client and facilitating communication with the agent located on the device client.

In accordance with another embodiment of the invention, a virtual assistant platform comprises a plurality of virtual assistants, each of the virtual assistants being configured to communicate with one or more users, and one or more shared data stores accessible by each of the virtual assistants, the shared data stores providing the virtual assistants with shared capabilities. One or more of the shared data stores comprises a world ontology understood by all of the virtual assistants. The virtual assistant platform further comprises one or more group virtual assistants to which one or more virtual assistants belonging to this or a different virtual assistant platform subscribes, the group virtual assistants being configured to collect, analyze, store, and distribute information to the virtual assistants according to a status of each of the virtual assistants.

In accordance with another embodiment of the invention, a system for providing electronic assistance to a plurality of users includes one or more virtual assistant platforms, a plurality of virtual assistants each being accessible by one of the plurality of users and being configured to use one or more of the virtual assistant platforms to communicate with another of the plurality of virtual assistants, and one or more shared data stores accessible by each of the virtual assistants and providing the virtual assistants with shared capabilities. In the system, the virtual assistant platforms are arranged according to a hierarchy that determines parameters for communication between each of the plurality of virtual assistants. The hierarchy may include a first level preventing access to personal data of a first of the users by any of the virtual assistants that is not accessible by the first user, a second level including a plurality of group virtual assistants to which one or more of the virtual assistants subscribes, and a third level comprising one or more networks accessible by one or more of the virtual assistant platforms. One or more of the shared data stores may include a world ontology understood by all of the virtual assistants. The system may further include a group virtual assistant to which one or more of the virtual assistants subscribes, the group virtual assistant being configured to distribute information to the subscribed virtual assistants according to a status of each of the virtual assistants.

In accordance with another embodiment of the invention, a system for providing electronic assistance to a plurality of users includes one or more virtual assistant platforms, a plurality of virtual assistants, and one or more shared data stores accessible by each of the virtual assistants, wherein the one or more virtual assistant platforms are arranged according to a network topology that determines parameters for communication between each of the plurality of virtual assistants. Each of the virtual assistants may be accessible by one of the users and configured to use one or more of the virtual assistant platforms to communicate with another of the of virtual assistants. The shared data stores may provide the virtual assistants with shared capabilities.

The network topology may be a hierarchy of the virtual assistant platforms that may include a first level preventing access to personal data of a first of the users by any of the virtual assistants that is not accessible by the first user, a second level comprising one or more group virtual assistants to which one or more of the virtual assistants subscribes, and a third level comprising one or more networks accessible by one or more of the virtual assistant platforms. One of the virtual assistants that is accessible by the first user may be a personal virtual assistant authorized to access or modify the personal data of the first user. The first level may be isolated from any public network and from any semi-private network. One of the virtual assistants that is accessible by the first user may be a subscriber virtual assistant that subscribes to one or more of the group virtual assistants. The subscriber virtual assistant may communicate with other of the virtual assistants according to the second level of the hierarchy, and may not communicate with the other virtual assistants, according to the first level of the hierarchy. The subscriber virtual assistant may also be a personal virtual assistant of the first user, and the subscriber virtual assistant may be configured to communicate with other virtual assistants according to the first level or the second level of the hierarchy.

One or more of the networks accessible by the virtual assistant platforms according to the third level of the hierarchy may be a non-VAP-native user network. The virtual assistant platforms may access each of the non-VAP-native user networks using an application programming interface for the non-VAP-native user network. One or more of the networks accessible by the virtual assistant platforms according to the third level of the hierarchy may be a VAP-native network. One or more of the VAP-native networks may be an emergent network implemented by one or more of the virtual assistant platforms. The emergent networks may be accessible by only those of the users that configure one of the virtual assistants to which the user has access to participate in the third level of the hierarchy. Each of the emergent networks may include a plurality of nodes each representing one of the users that can access the emergent network. The user may configure one of the virtual assistants to participate directly in the third level of the hierarchy, or the user may configure one of the virtual assistants to participate in the third level of the hierarchy by subscribing to a group virtual assistant that participates in the third level of the hierarchy.

The network topology may be a mesh. A first of the virtual assistants may operate for a first of the users on a first of the virtual assistant platforms, a second of the virtual assistants operates for a second of the users on a second of the virtual assistant platforms, and the first virtual assistant platform and the second virtual assistant platform may be configured to allow the first virtual assistant to interact with the second virtual assistant. A third of the virtual assistants may be a first group virtual assistant operating on a third of the virtual assistant platforms, and the first virtual assistant and the second virtual assistant may subscribe to the first group virtual assistant. A fourth of the virtual assistants may be a second group virtual assistant operating on a fourth of the virtual assistant platforms, and each of the first virtual assistant, the second virtual assistant, and the first group virtual assistant subscribe to the second group virtual assistant.

For one or more of the users, one of the virtual assistants accessible by the user may be a personal virtual assistant that is installed on an electronic device of the user and has a first adapter agent configured to communicate electronically with one or more sensors, such communication including receiving sensor data from the sensors. One or more of the sensors may be worn on one or more of the users' bodies. One of the virtual assistants may be a first group virtual assistant configured to process the sensor data. The personal virtual assistant may be subscribed to the first group virtual assistant, and may have a main agent configured to receive the sensor data from the first adapter agent and transmit the sensor data to the first group virtual assistant. The first group virtual assistant may be configured to process the sensor data by comparing the sensor data to a plurality of records in one or more first databases and, upon matching the sensor data to one or more first results, communicating the first results to the main agent of the personal virtual assistant. One of the virtual assistants may be a second group virtual assistant configured to process the sensor data and the first group virtual assistant may be subscribed to the second group virtual assistant and configured to send the sensor data to the second group virtual assistant. The second group virtual assistant may be configured to process the sensor data by, upon receipt of the sensor data, comparing the sensor data to a plurality of records in one or more second databases different from the first databases and, upon matching the sensor data to one or more second results, communicating the second results to the main agent of the personal virtual assistant via the first group virtual assistant.

In accordance with another embodiment of the invention, a system includes a plurality of virtual assistant platforms implemented on a plurality of electronic devices in communication with each other via one or more electronic communication networks, the electronic devices including one or more of a plurality of user devices and one or more computer servers. The system further includes a plurality of virtual assistants, each of the virtual assistants being accessible by one or more users via the user's user device, and being configured to use one or more of the virtual assistant platforms to communicate with another of the plurality of virtual assistants. The system further includes one or more shared data stores stored in computer memory of one or more of the electronic devices, the shared data stores being accessible by each of the virtual assistants, and the shared data stores providing the virtual assistants with shared capabilities. The virtual assistant platforms are arranged according to a hierarchy that determines parameters for electronic communication between each of the plurality of virtual assistants.

BRIEF DESCRIPTION OF THE DRAWINGS

The present invention will become more apparent from the detailed description set forth below when taken in conjunction with the drawings, in which like elements bear like reference numerals.

DETAILED DESCRIPTION OF THE INVENTION

Figure 1:
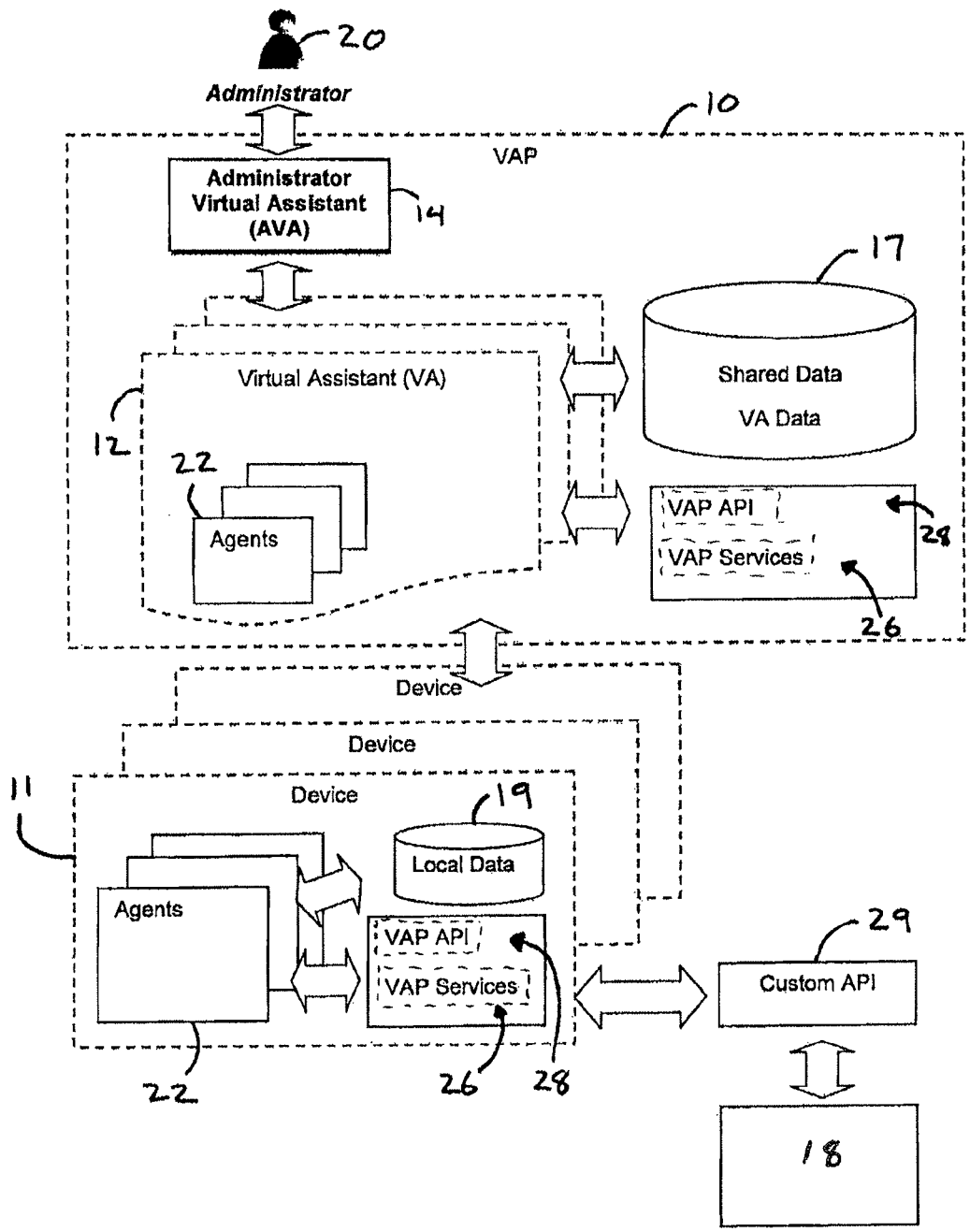
FIG. 1 is a schematic diagram of an example of a virtual assistant platform in accordance with the present disclosure.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures. The figures depict selected embodiments and are not intended to limit the scope of embodiments of the invention. Skilled artisans will recognize the examples provided herein have many useful alternatives and fall within the scope of embodiments of the invention.

The following description refers to elements or features being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically, such as when elements or features are embodied in program code. Thus, although the figures depict example arrangements of processing elements, additional intervening elements, devices, features, components, or code may be present in an actual embodiment.

The invention may be described herein in terms of functional and/or logical block components and various processing steps. It should be appreciated that such block components may be realized by any number of hardware, software, and/or firmware components configured to perform the specified functions. For example, an embodiment may employ various integrated circuit components, e.g., memory elements, digital signal processing elements, logic elements, diodes, look-up tables, etc., which may carry out a variety of functions under the control of one or more microprocessors or other control devices. Other embodiments may employ program code, or code in combination with other circuit components.

In accordance with the practices of persons skilled in the art of computer programming, the present disclosure may be described herein with reference to symbolic representations of operations that may be performed by various computing components, modules, or devices. Such operations may be referred to as being computer-executed, computerized, software-implemented, or computer-implemented. It will be appreciated that operations that can be symbolically represented include the manipulation by the various microprocessor devices of electrical signals representing data bits at memory locations in the system memory, as well as other processing of signals. The memory locations where data bits are maintained are physical locations that have particular electrical, magnetic, optical, or organic properties corresponding to the data bits.

As non-limiting examples unless specifically indicated, any database or data store described herein may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, or other means of data storage located on a computer, client, server, or any other storage device known in the art or developed in the future. File systems for file or database storage may be any file system, including without limitation disk or shared disk, flash, tape, database, transactional, and network file systems, using UNIX, Linux, Mac OS X, Windows FAT or NTFS, FreeBSD, or any other operating system.

The various aspects of the invention will be described in connection with providing a virtual assistant platform for virtual assistants that communicate with users via electronic devices to perform particular tasks. That is because the features and advantages that arise due to the invention are well suited to this purpose. However, it should be appreciated that the invention is applicable to other procedures and to achieve other objectives as well.

Figure 2:
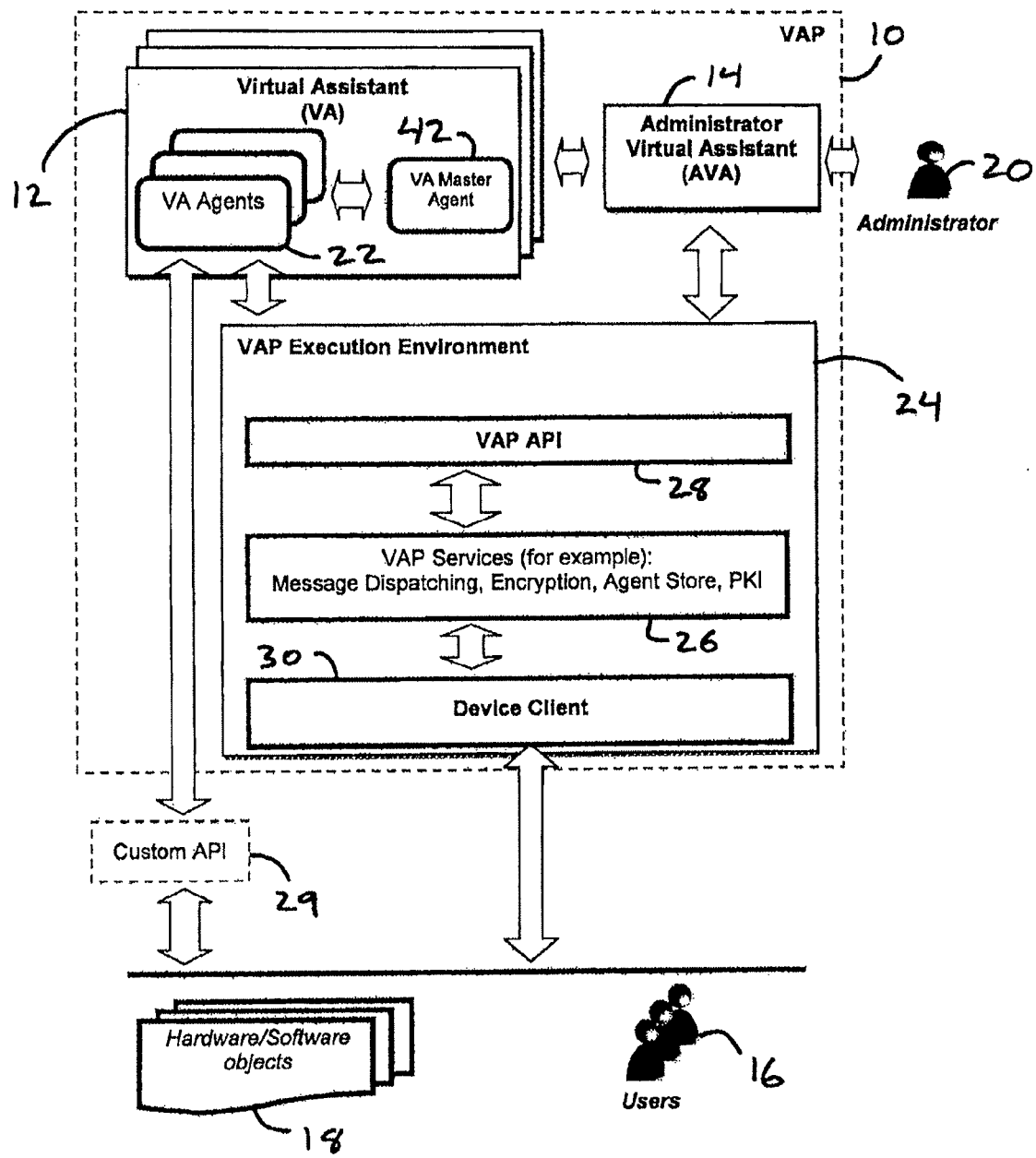
FIG. 2 is a schematic diagram of the virtual assistant platform of FIG. 1 further showing a platform execution environment and a target platform.

Referring to FIGS. 1 and 2, a virtual assistant platform ("VAP") 10 may be a computing hardware or software framework, or a combination thereof, that provides the computational resources in at least one computer or computing device upon which one or more virtual assistants ("VAs") 12 may operate. The VAs 12 may communicate with one or more users 16, and may further communicate with one or more hardware or software objects 18 through one or more devices 11 in electronic communication with the VAP 10, or on other computing devices as described in more detail below. The VAP 10 may be implemented in the cloud (on one or more virtual machines), on a remote server or across multiple servers, such that the VAs 12 communicate over the internet or another electronic network. Alternatively, the VAP 10 may be implemented on a user's 16 computer or computers, such that the VAs 12 communicate over a home network or other secured network. Alternatively, the VAP 10 may be implemented on a user's 16 mobile device or devices, such as a mobile phone or tablet, and the VAs 12 may communicate using the hardware and software interfaces of the mobile device, including communicating with the user 16 via sound or visual displays, and communicating with objects 18 on remote devices via the internet or a cellular network.

The scope of communication between a VA 12 and users 16 or objects 18 may depend on the capabilities and accessible resources 17, 19 of the VA 12. In one embodiment, a VA 12 may be configured to deliver messages to a user 16 via an electronic device that the user 16 possesses, such as a desktop computer or a mobile phone. In other embodiments, a VA 12 may interact with a user 16 or a plurality of users 16, in that the VA 12 both delivers output to the user 16 and receives input from the user 16, which the VA 12 may transmit to a destination or perform other processing upon. In still other embodiments, a VA 12 may be configured to perform complex tasks, including personal tasks for a user 16 such as checking and sorting email or monitoring a home security system, or professional tasks such as normalizing data acquired in multiple formats or coordinating subordinate VAs, as described in more detail below. The VA 12 may store its resources, which may include accessible agents 22, local data 19, and shared or VA-specific data 17, locally or through access to a data store maintained by the VAP 10. A VAP 10 may include an administrative virtual assistant ("AVA") 14 that is configured to manage the VAs 12 of the VAP 10. An administrator 20 may use the AVA 14 to add, delete, and configure VAs 12 according to the capabilities required of the VAP 10. Each VA 12 may perform tasks and communicate with the users 16, objects 18, other VAs 12, or other devices using one or more agents 22. An agent 22 may be an autonomous or semi-autonomous software or hardware component configured to perform a particular task, as described in more detail below.

Referring to FIG. 2, the VAP 10 may include an execution environment 24 configured to store and process agents 22, and further to provide VAP-implementation services 26 to the agents 22. VAP-implementation services 26 may enable the operation of agents 22, and therefore VAs 12, within the VAP 10 and between devices with which the VAs 12 communicate. Such services 26 may include, without limitation: an agent 22 registration service that creates, stores, searches, instantiates, manages, distributes, applies, and deletes agents 22 within a VA 12, and further tracks the agents 22 and VAs 12 with which an agent 22 may communicate; an agent 22 programming service for modifying the preprogrammed logic of the agent 22 as described below; an agent 22 interpreter that translates external requests into the agents' 22 language and vice versa; addressing and messaging services that identify appropriate agents 22 to receive messages, define how agents 22 identify and communicate with each other, and handle prioritization and delivery of messages; one or more security services for authenticating agents 22 and encrypting and decrypting their communications using certificate authorization, a public-key infrastructure, or any other means to secure the communication; one or more data storage and retrieval services, such as a shared data store service that shares common data between all VAs in a VAP; and one or more interfacing services.

The execution environment 24 may include a VAP application programming interface ("API") 28 that allows multiple agents 22 to communicate with each other within a VA 12, between VAs 12, or to specific objects 18 or devices 11 as needed. Further, agents 22 may make use of the VAP API 28 to get access to VAP services 26 and related resources within the VAP 10. The VAP API 28 may provide a single standard programming interface for agents created in any programming language or operating system. The VAP API 28 may be implemented in any suitable software framework, such as MICROSOFT .NET, Web Services, ActiveX, SOAP, and the like. In one embodiment, all messages pertaining to VAP 10 functionality, including messages between agents 22 and messages pertaining to VAP resources 17, 19 and VAP services 26, may be passed through the VAP API 28, which may perform one or more of input validation, error handling, and interfacing with particular VAP services 26. Agents 22 may make use of one or more custom APIs 29 that function outside of the VAP execution environment 24 to perform external services as described in detail below.

Facilitating inter-agent and agent-to-service messaging through the VAP API 28 allows for standardization of message formatting and data access. The VAP API 28 may have or coordinate access to data or VAP 10 conditions that the agents 22 taking part in the message cannot access. In addition, in some embodiments a plurality of VAPs 10 may be organized according to a suitable internetworking pattern or topology (e.g., mesh, star, bus, hierarchy, etc.) as described further below. One or more of the VAPs 10 may be configured to include one or more agents 22 that use a custom API 29 to interface with an external software- or hardware-based communication network, such as an internet-based social network or an isolated LAN. In some embodiments, one or more custom APIs 29 may enable the VAs 12 to participate in emergent networks of any topology by residing in or communicating with multiple VAPs 10.

In some embodiments, message formatting and processing within the execution environment 24 may be implemented by a natural language processing pipeline. Natural language commands comprise phrases typically input by a user 16 and parsed according to sentence structure and parts of speech. The VAP API 28 or other elements of the execution environment 24 may be configured to execute the processing pipeline to determine the nature of the commands and distribute tasks and data to the appropriate agents 22. In addition to user 16 input, natural language syntax may be used for communications between agents 22 in place of or in addition to artificial programming protocols. Any suitable implementation of a processing pipeline may be used. By way of example, a message containing natural language may be: wrapped in XML or another tagging language to increase efficiency of processing; processed as a whole or divided into composite parts, such as text and object (i.e. a document attached to the message), subject and predicate, or parts of speech (i.e. verb, noun, prepositional phrase, and the like); parsed after receipt or in real-time as the natural language is entered; augmented with additional data at discrete processing steps; and analyzed to determine if multiple commands are present, such as when a user 16 enters a multiple-step script for one or more agents 22 to follow.

A device client 30 may be installed on each device that is to be connected to the VAP 10. The device client 30 may be a hardware or software component, as is suitable for the device on which it is installed. Suitable devices include any device that can be configured to transmit information about its state or receive input that modifies its state. Examples of such devices include, without limitation: personal computing devices such as desktops, laptops, tablet computers, mobile phones, digital media players, and the like; home or office audio or video equipment, such as televisions, projectors, theater components, recording or playback devices, and the like; dedicated servers, such as application, communication, mail, database, proxy, fax, file, media, web, peer-to-peer, standalone, software, or hardware servers, which may use any server format known in the art or developed in the future (possibly a shared hosting server, a virtual dedicated hosting server, a dedicated hosting server, or any combination thereof); monitoring systems, such as home security systems, thermostats, vehicle status monitors, infant monitors, and the like; wearable devices, such as watches, goggles, bracelets, devices implanted into cloth, and the like; and biological implants, such as pacemakers, catheters, and the like. Suitable devices may further include software-based or pure-software devices, including, without limitation: cloud computing frameworks, such as AMAZON ELASTIC COMPUTE CLOUD, MICROSOFT WINDOWS AZURE, and the like; search engines; social networks; and email services. The device client 30 may be configured to communicate with one or more agents 22 of one or more VAs 12. The device client 30 itself may comprise one or more agents 22, either permanently or upon receiving an agent 22 from the VAP 10, that perform particular tasks upon the device or objects 18 contained therein, or interact with a user 16 thereof. In one embodiment, the user 16 installs a device client 30 on each device that the user 16 wants to communicate with the VAP 10. The installation itself of the device client 30 may authorize the device in the VAP 10, or the user 16 may separately authorize the device for use in the VAP 10. Once installed, the device client 30 may coordinate local device resources for access by the VA 12. Such coordination may include providing, to one or more agents 22, access to all or a subset of the user's documents, photographs, device settings, applications, usage authorizations, and other information stored on the local device, as well as control of all or a subset of the device's equipment, such as video camera, speakers, sensors, and the like. Such access may depend on permissions set by the user.

Figure 3A:
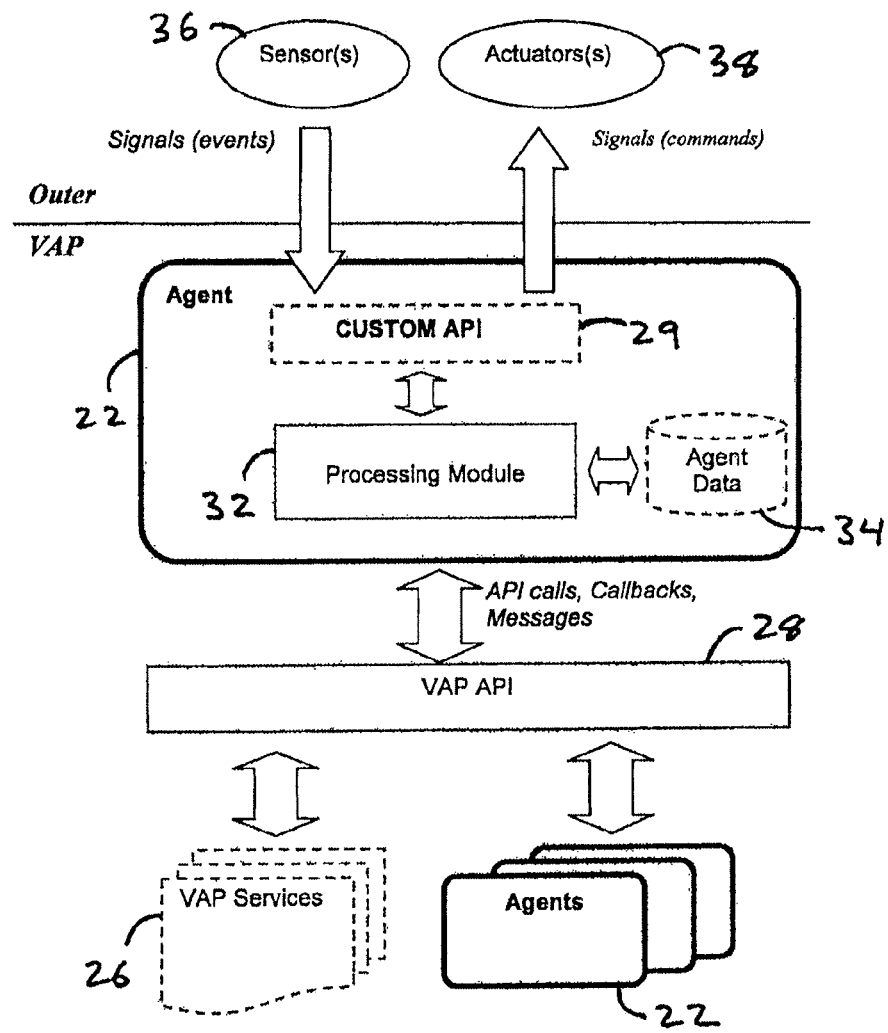
FIGS. 3A and 3B are schematic diagrams of two examples of an intelligent agent.
Figure 3B:
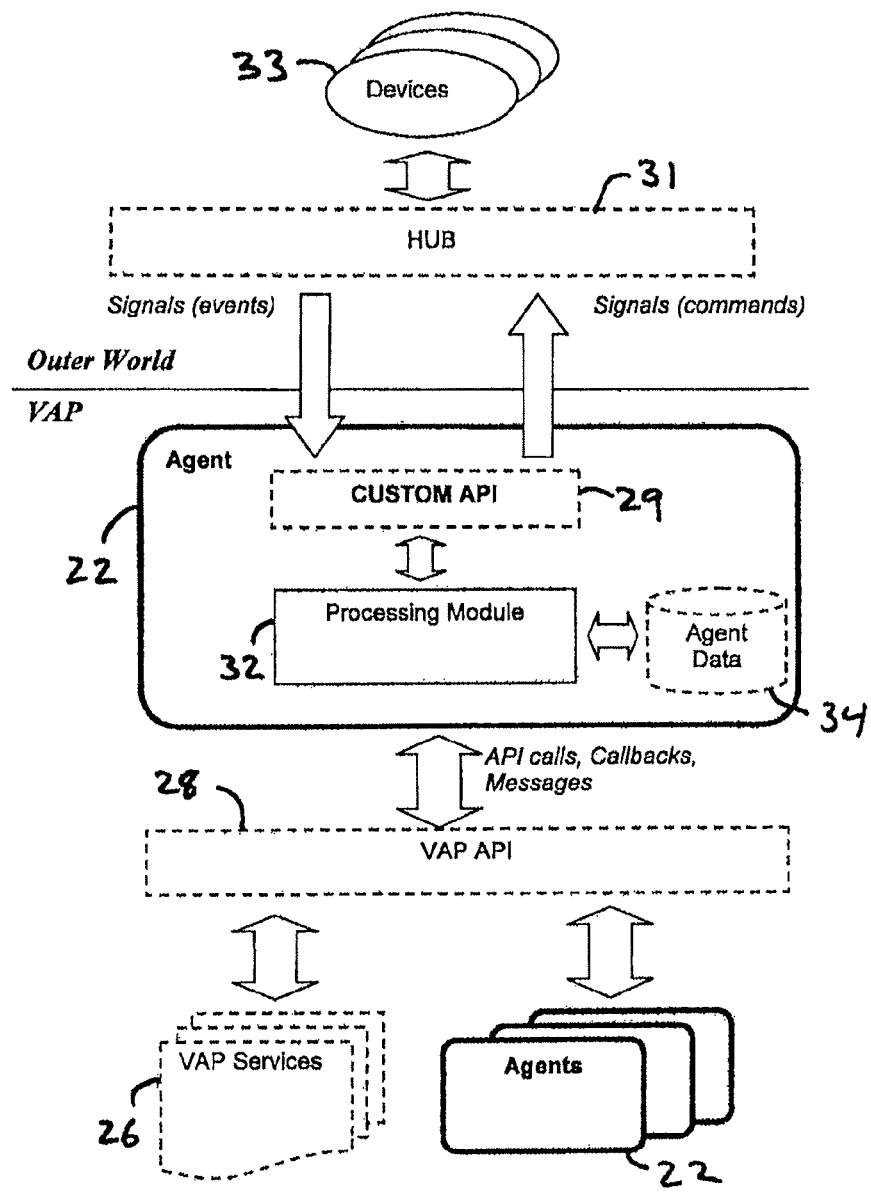

Referring to FIGS. 3A and 3B, an agent 22 may be configured to observe or interact with the outside world, which comprises one or more environments outside the VAP 10. Outside worlds can include physical environments, software or other computing environments, other VAPs, and other environments. As shown in FIG. 3A, the agent 22 may receive, as input, a signal from one or more sensors 36, and may transmit, as output, a signal to one or more actuators 38. A sensor 36 is a device or software program that may indicate the occurrence of an event or transmit status information to the agent 22 upon request, at predetermined intervals, or when the event occurs. Examples of sensors may include but are not limited to temperature sensors, gyroscopes, accelerometers, optical sensors, biometric sensors, and the like. An actuator 38 is a device or software program that performs an action accord to a command sent by the agent 22. As shown in FIG. 3B, the agent 22 may exchange input and output with a hub 31 that manages communications to and from a plurality of networked devices 33. The device 33 may be user devices as described above, or may be "smart" devices that control or monitor objects 18 or perform other external services. For example, the hub 31 may be a device controller for a user's 16 home, and the devices 33 may be networked control units for controlling an alarm system, HVAC system, central power or power outlet, water heater, lighting system, and the like. The agent 22 may further exchange input and output with other agents 22. The agent 22 uses the VAP-implementation services 26 described above as needed.

An agent 22 may perform tasks that require communication with objects 18 or that relate to external services—that is, services that are not connected to the VAP 10. External service functionality can be made available to agents 22 of a VA 12 through third-party provision of a custom API 29 that includes program routines and instructions to configure the agent 22 for performing the tasks. For example, the custom API 29 may include a program routine that turns on exterior lights at a users 16 home. An agent 22 tasked with receiving an input, determining if the input indicates the exterior lights should be turned on, and turning on the exterior lights may access the custom API 29 to execute the associated stored program routine. Similarly, an agent 22 may be configured to serve as an adapter for driving communication between the VAP 10 and an external device, such as the hub 31, networked device 33, or another device 11 connected to the user 16 or object 18. Such an adapter agent may be provided to the VAP 10 from a third party. The adapter agent may be distributed to the VAP 10 and made available to other VAPs through an agent store 80 as described below. The adapter agent may inform the VAP 10 of the basic actions the external device can perform and the commands the external device is capable of interpreting. The VAP 10 may then use other agents 22 to translate more complex commands, such as natural language phrases as described above, into the basic commands provided by the adapter agent.

The agent 22 may comprise a processing module 32 and an agent data store 34 that may be accessed and modified by the processing module 32. The processing module 32 may comprise preprogrammed logic that defines the behavior of the agent 22. The preprogramming logic may include one or more algorithms, implemented with hardware or software modules, for processing input, deciding what action to take, if any, based on the input, and generating output according to the selected action. The behavior of the agent 22 may have a particular degree of complexity. In some embodiments, the agent 22 may be an intelligent agent capable of choosing and taking action in pursuit of accomplishing one or more tasks or subtasks. The agent 22 may further be capable of learning, in that the logic and its algorithms may change over time in light of input, output, and/or data in the agent data store 34.

The agent data store 34 may comprise one or more agent knowledge stores and one or more agent file stores. An agent knowledge store may include one or more ontologies. An ontology may be understood herein to mean a collection of data that defines the scope and procedures by which agents 22 may perform tasks. An ontology may contain facts, rules, and other types of structured and unstructured information typically found in a knowledge base. Data in an ontology may be unstructured or may be organized into files, databases, hierarchies, and the like. An ontology may facilitate the agent's 22 communication with other agents 22 within or outside the VA 12, and further may facilitate the agent's 22 communication with users 16, objects 18, or other devices outside the VA 12. Ontologies may be shared with other data stores and repositories in the VAP 10, such as in the shared data store 17, VA shared data store 52, or device data store 54, in order to facilitate this communication.

The agent 22 may update each ontology through receipt of input or other processing, or the VA 12 may update each ontology, such as when a software, firmware, or hardware upgrade is propagated in the VAP 10. The rules of each ontology may be organized into one or more rule sets that are interpreted by the processing module 32 in order for the agent 22 to perform tasks. Rules may be added, removed, or changed within each rule set as needed for the agent 22 to perform its tasks or subtasks. An agent file store may include one or more files, such as image or document files, databases, folders, and other articles of data that the agent 22 may access in performance of its tasks. The agent file store may be accessible only by the agent 22, or may be a shared file store accessible by other agents or VAs.

According to the algorithms, rules, and data provided to it, the agent 22 may perform one or more tasks or subtasks, and may be dedicated to such tasks or subtasks or may be capable of learning new tasks or subtasks to perform. As non-limiting examples, an agent 22 may perform: speech recognition; text-to-speech conversion; text, graphical, or video displays; event scheduling and notification; alarm monitoring and notification; web crawling and searching; digital information aggregation and distribution; personal transacting such as stock transfers, store purchases, or reservation booking; phone or video call management; document and other file normalization, including conversion between different formats and display and editing functionality; context interpretation, wherein the agent 22 parses environmental conditions such as time, temperature, and location, and informs other agents 22 if the context affects their operation; updating and retrieving information from the user's accounts at various web sites, web services and social networks; and the like. The agent 22 may be configured to adapt to a user's 16 routines, preferences, habits, behaviors, and moods. For example, such information about the user's 16 routines may be, at least partially, determined using feedback from the sensor alone or in combination with user input. For example, the user's 16 mood may discerned by feedback from optical and temperature sensors 36 in combination with feedback discerned from information communicated through the device, such as a user updating a social network status to indicate information about the user's mood.

The agent 22 may be configured to expand its knowledge and file stores with respect to particular tasks or topics. For example, a VA 12 that assists a doctor can include an agent 22 that aggregates formal ethical opinions, an agent 22 that consolidates collected opinions to produce and update a list of consultation requirements, an agent 22 that records patient consultations, an agent 22 that parses transcripts of the consultations to check that the consultation requirements are met, and an agent 22 that presents and updates a checklist indicating whether the doctor has fulfilled the consultation requirements in real time during the consultation.

Figure 4:
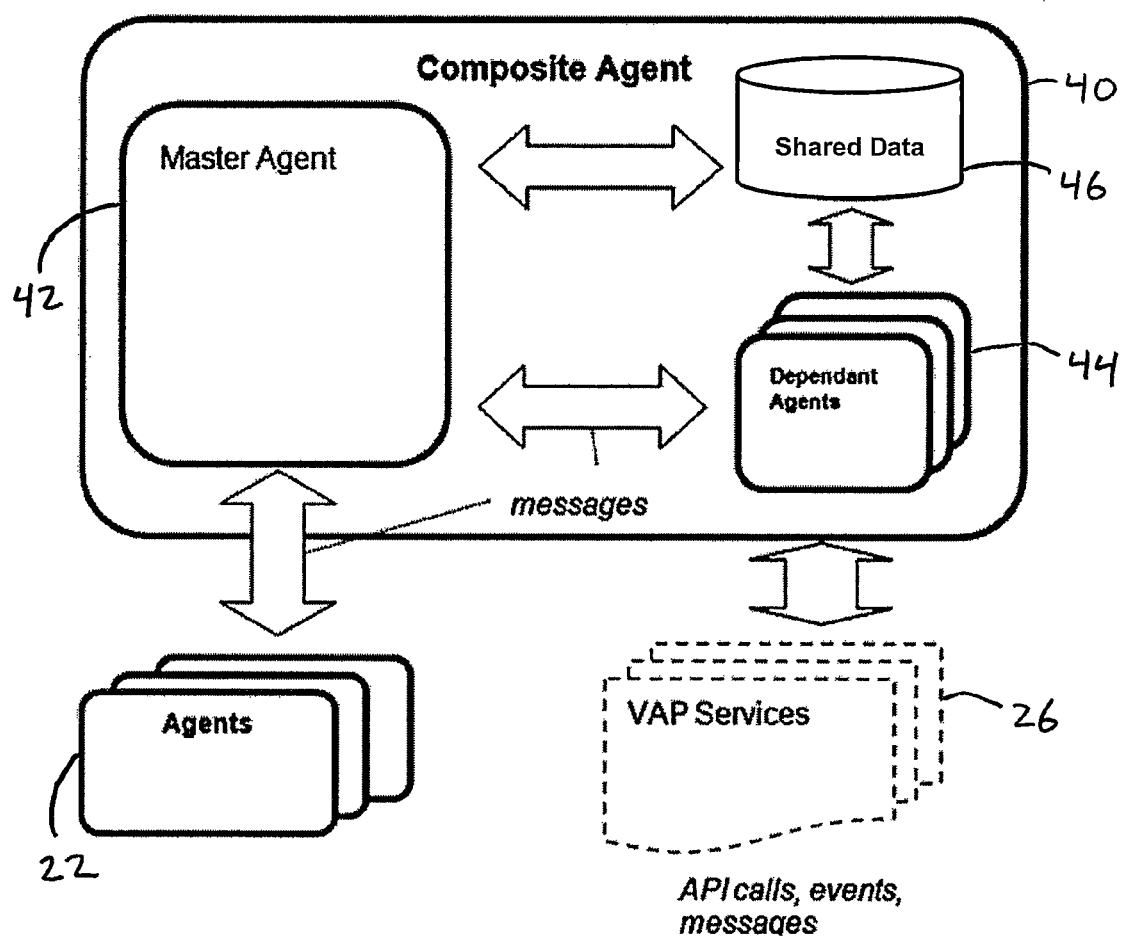
FIG. 4 is a schematic diagram of an example of a composite intelligent agent.

Referring to FIG. 4, one or more agents may be a composite agent 40 comprising a master agent 42 and one or more dependent agents 44. The master agent 42 and each dependent agent 44 may have a configuration as described with respect to FIG. 3, above. However, the dependent agents 44 may be restricted from communicating with the outside world, and may be dedicated to performing tasks within the composite agent 40. The master agent 42 may coordinate the activities of the dependent agents 44 and may communicate outside the composite agent 40. In addition or alternatively to its own agent data store 34, the master agent 42 and each of the dependent agents 44 may access a shared data store 46 that may include knowledge and file stores as in the agent data store 34. The structure of the composite agent 40 advantageously allows delegation of subtasks by the master agent 42 to dependent agents 44.

Figure 5:
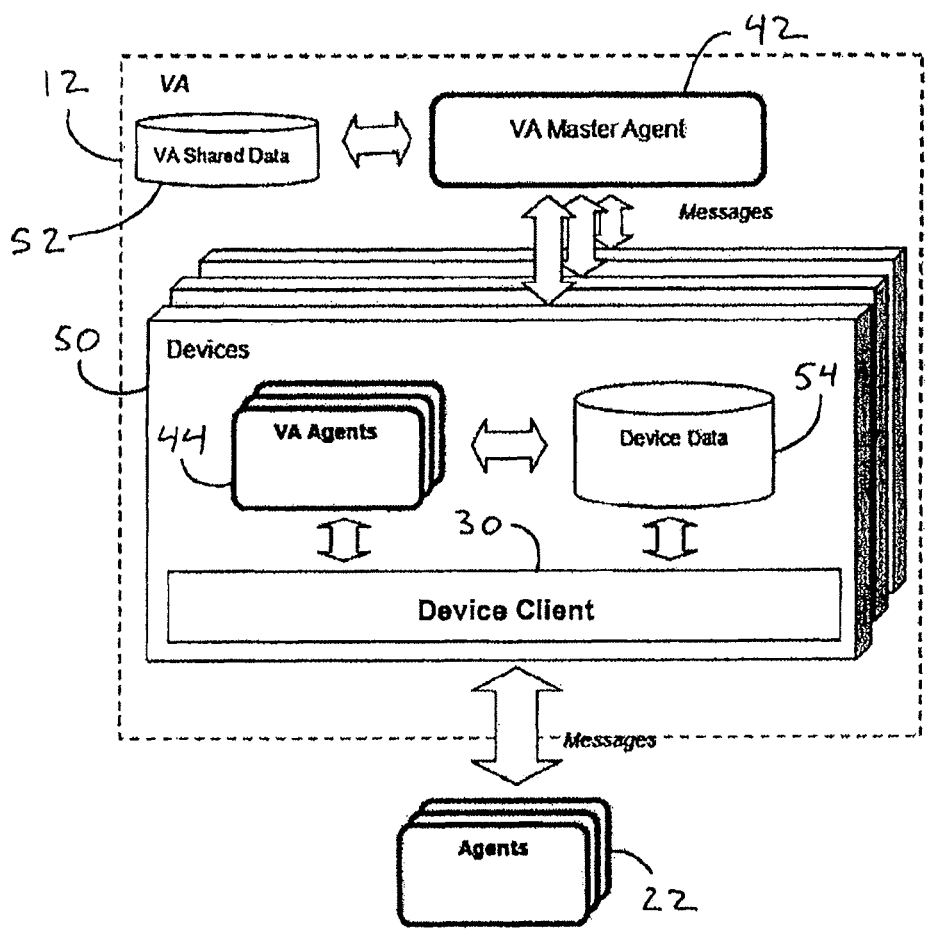
FIG. 5 is a schematic diagram of a virtual assistant in accordance with the present disclosure.

Referring to FIG. 5, a composite agent may be distributed within a VA 12 such that the master agent 42 resides outside of the devices 50 to which the VA 12 is connected, while dependent agents 44 reside on each of the devices 50. In one embodiment, the master agent 42 resides in a distributed system, such as a cloud computing framework. The master agent 42 may access a VA shared data store 52, which may be dedicated to the master agent 42 or shared with additional master agents, if the VA includes a plurality of composite agents, or with agents 22 that are not composite.

The VA shared data store 52 may include one or more ontologies, as described above with respect to the agent data store 34, that facilitate the VA's 12 internal communication between agents in the VA 12, and external communication with devices 50, users 16, objects 18, and agents 22 of other VAs 12. Ontologies within the VA shared data store 52 may include a "world ontology" comprising vocabulary and taxonomy that is common to all VAs 12 in the VAP 10. Ontologies within the VA shared data store 52 may also include one or more private or semi-private (i.e., shared) ontologies that may be understood only by the VA 12 and the devices 50 that are connected to it. The ontologies may be organized into one or more hierarchies according to the system components that can access and/or understand each ontology. In an embodiment of an ontological hierarchy, the world ontology may be the broadest ontology, as it may be understood by all agents 22, 40 and VAs 12 in the VAP 10. At the opposite end of the hierarchy, a domain ontology may govern access to a particular element or set of elements in the system (i.e., a domain) by defining the logic and data for the domain. A domain may be a file, a database or set of databases, an agent or set of agents, an object or set of objects, a VA (e.g., any VA described herein), etc. An upper ontology may be an ontology that defines logic and data for a set of domains. Definitions from higher ontologies may pass by inheritance to ontologies below within the hierarchy.

The VA 12 may update each ontology directly or through output from agents. The ontologies in the VA shared data store 52 may further include one or more rule sets that are interpreted by the processing module 32 of each agent 22 or master agent 42, and that may be propagated by the master agent 42 to its dependent agents 44. Rules may be added, removed, or changed within each rule set as needed for the agents of the VA 12 to perform their tasks or subtasks. Thus, the VAs 12 and their agents that access the ontologies may expand the sets of facts and definitions and the logic and framework thereof to accommodate an expanding field of information.

The VAP 10 may use the world ontology to grant shared capabilities to the VAs 12 of the VAP 10. Shared capabilities are tasks, such as reporting, file management, interaction, user representation, secured transaction, information retrieval, and information sharing, that a VA 12 may partially or fully perform for a user 16. The tasks are shared, or sharable, between VAs 12 because the VAs 12 have access to the same secured data stores and specially-programmed agents 22, 40 that allow performance of the tasks. In this manner, a VAP 10 may comprise a distributed system that provides the same type of assistance to all of its users 16 through their corresponding VAs 12. Furthermore, each user 16 may be able to assist or otherwise communicate with the other users 16 of the VAP 10 in one or more ways, including, without limitation: providing computing resources by connecting devices 50 to the VAP 10; answering questions or otherwise providing information through the VA 12, which may be added to the world ontology or another shared knowledge store; connecting the user's 16 VA 12 to one or more social networks; and sharing data over a secured channel.

Agents 22 or dependent agents 44 of the VA 12 may engage a device 50 by communicating with the device client 30, and therefore the agents may not be instantiated on the device 50 itself. In this embodiment, the agents 22 or dependent agents 44 may be instantiated remotely from the device 50, such as within a cloud computing framework or on a remote server. Alternatively or additionally, one or more agents may be instantiated on the device 50 itself, so that a network connection to the agents' location is not required. Within each device 50, the agents may access a device data store 54 comprising the device data, the type of which may depend on the device 50 but may include files, databases, and system settings on which the agents may operate.

Figure 6:
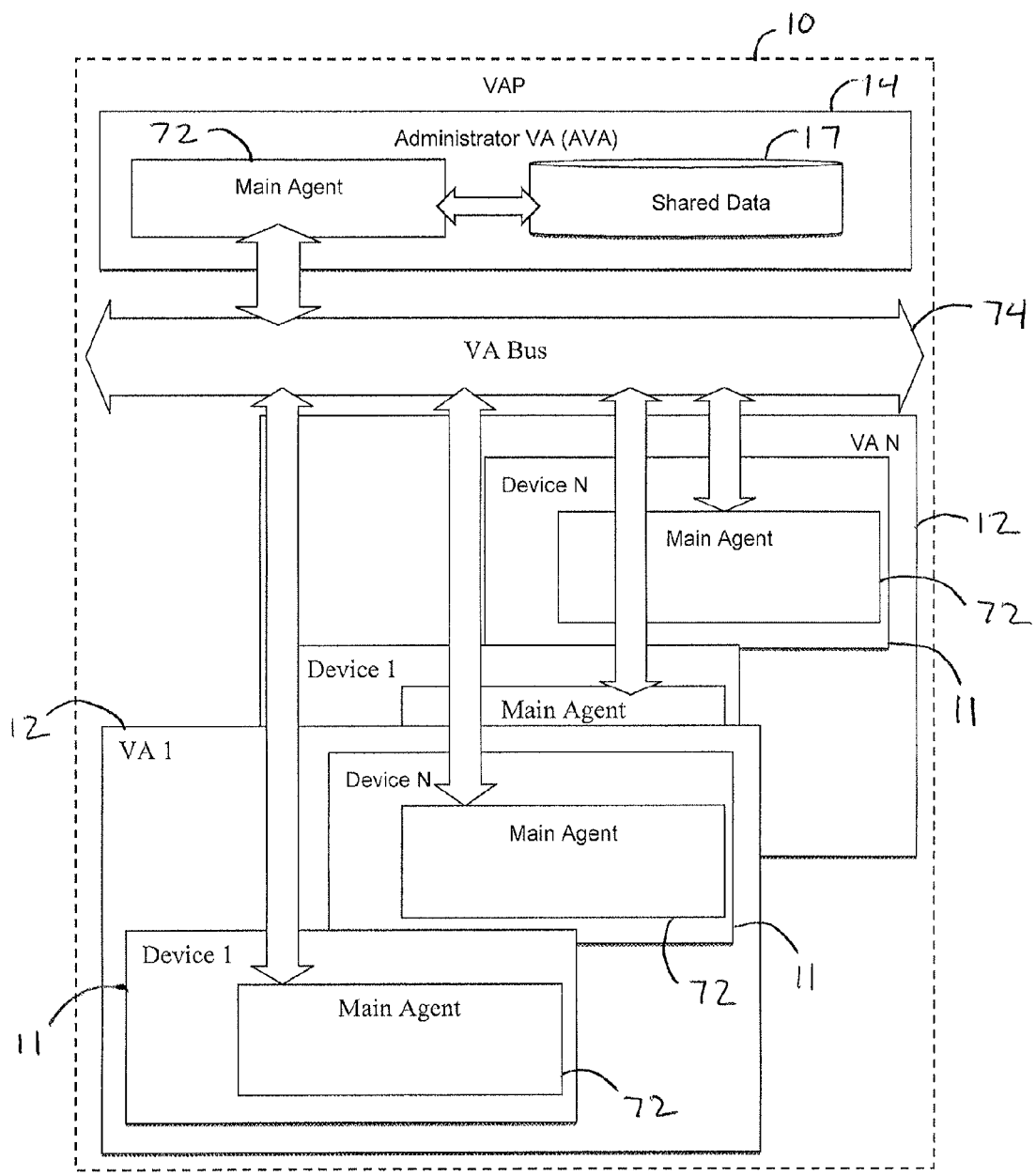
FIG. 6 is a schematic diagram of another virtual assistant platform in accordance with the present disclosure.

Referring to FIG. 6, another embodiment of the VAP 10 may use one or more main agents 72 in place of the master agent 42. A main agent 72 may have similar composition and function to a master agent 42, in that a main agent 72 resides on each VA 12 and interfaces with other agents 22 to manage the activities of the latter. The main agent 72 may be a composite agent but is not required to be. The main agent 72 may belong to a class of agents referred to herein as service agents. Service agents may be distributed to devices 11 together with the device client 30 and cannot be changed by the user. Service agents may perform basic VAP services, like those performed by VAP services 26, and may communicate with each other over dedicated communication channels, or busses. Service agents may be granted full permissions to access VAP 10, device 11, and VA 12 resources and information in order to perform their tasks.

A main agent 72 may be configured to enable its VA 12 on its device 11 regardless of the accessibility state of any other elements of the VAP 10. Thus, preferably, all VAs, including the AVA 14, have a main agent 72. In FIG. 6, the AVA's 14 main agent 72 may access the shared data 17, and may communicate with main agents 72 on each device 11 in the VAP 10 via a VA bus 74. Preferably, only main agents 72 can communicate over the VA bus 74. Device-centric operation of the main agent 72 is described below.

In some embodiments, a device 11 (e.g., Device 1 . . . N in FIG. 6) may host multiple VAs 12 from a single VAP 10 (e.g., VA 1 . . . N in FIG. 6) or multiple VAs from multiple VAPs. In one example, the device 11 is a virtual machine hosted in a cloud service and configured to server multiple VAs 12. For such coexisting VAs 12, access to the device 11 resources may be shared, and in some cases may be maximized (i.e., 100% of device resources used) through dynamic allocation of the resources to each concurrently operating VA 12.

Figure 7:
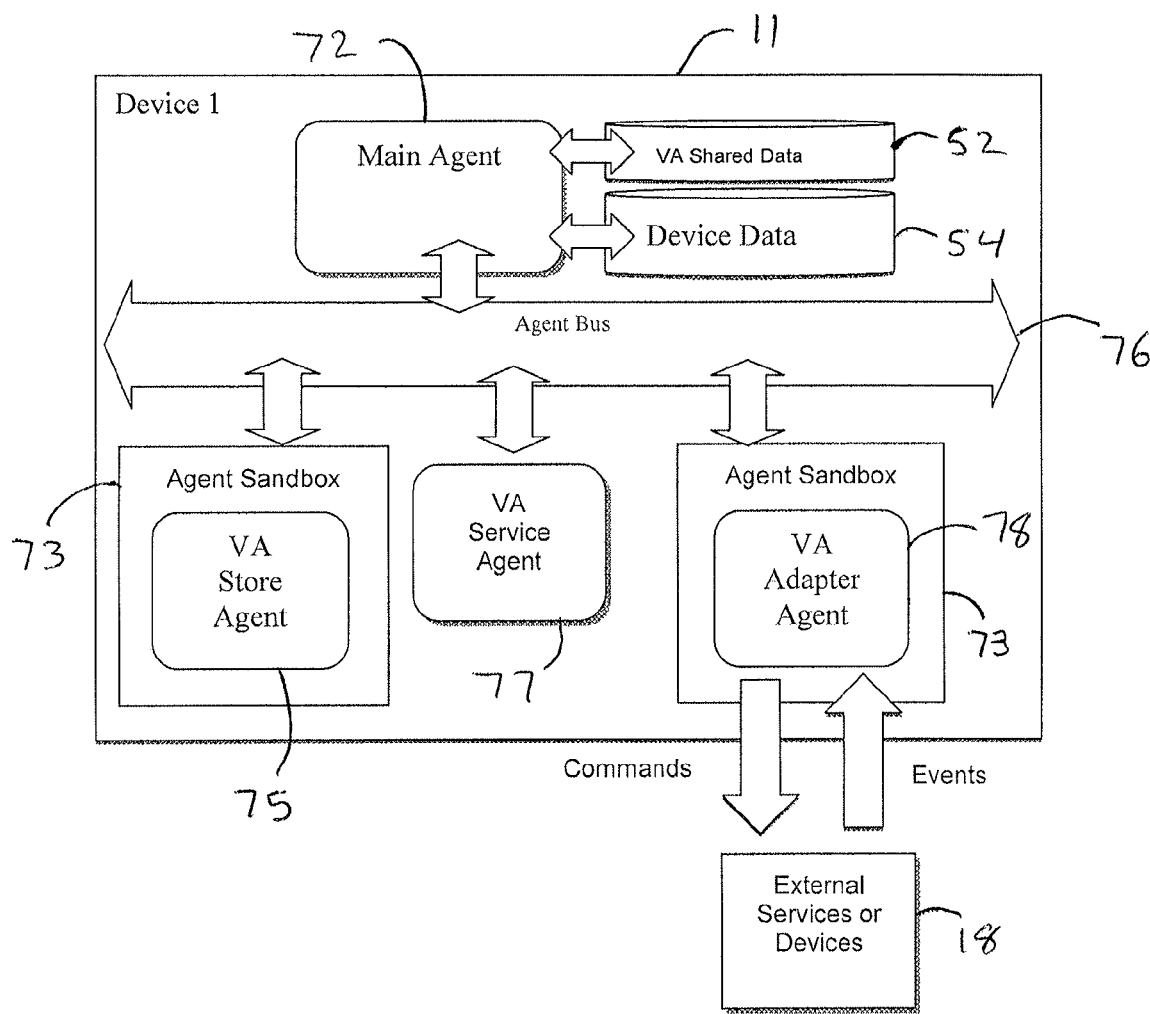
FIG. 7 is a schematic diagram of an electronic device served by a plurality of agents.

Referring to FIG. 7, in another embodiment of the VAP 10 the device client (not shown in FIG. 7) may include program code, modules, instructions, and/or data for implementing the VA 12 agents and services on a particular device 11. This implementation may include the main agent 72 communicating with other agents on the device via an agent bus 76. The agent bus 76 is a communication channel that may be dedicated to agent-to-agent communications on the device 11. The main agent 72 may also access data such as that stored in the VA shared data store 52 and device data store 54. Via the main agent 72 and agent bus 76, other agents on the device may also access the data on the device 11 to which the main agent 72 has access, provided such agents are granted the appropriate permissions to do so.

FIG. 7 further illustrates agents that are specialized for operation on the device 11. A store agent 75 may be any agent 22 as described above, which is downloaded to the device 11 from an agent store as described below. The store agent 75 may be configured to perform particular tasks and may have been designed by third parties unfamiliar to the device 11 operator. For security reasons, store agents 75 may be granted restricted access to device 11 resources and communication channels. In some embodiments, the store agents 75 may be placed in a "sandbox" 73, which is a software wrapper restricting agent 22 capabilities in accessing and modifying VA 12 data and logic.

Service agents 77 are described above with respect to the main agent 72. They may be part of the integral layer of VAP 10 operation and may have full access to all device 11, VA 12, and VAP 10 resources. Adapter agents 78 may provide communication between the VA 12 and the outside world. As described above, adapter agents 78 may receive data in the form of events from external objects 18, such as other software services (e.g., Dropbox, Facebook) or other devices (e.g., video camera, keyboard, mouse, water sprinkler system). The adapter agent 78 receiving the event creates an agent message from the event and passes it to the appropriate agent 22 via the agent bus 76. Similarly, the adapter agent 78 may receive an agent message from another agent 22 in the form of a command to be translated and sent by the adapter agent 78 to one or more of the objects 18. Adapter agents 78, like store agents 75, may be created by an unfamiliar third party and downloaded to the device 11 from the agent store. Thus, adapter agents 78 may be placed in a sandbox 73 for security reasons.

Figure 8:
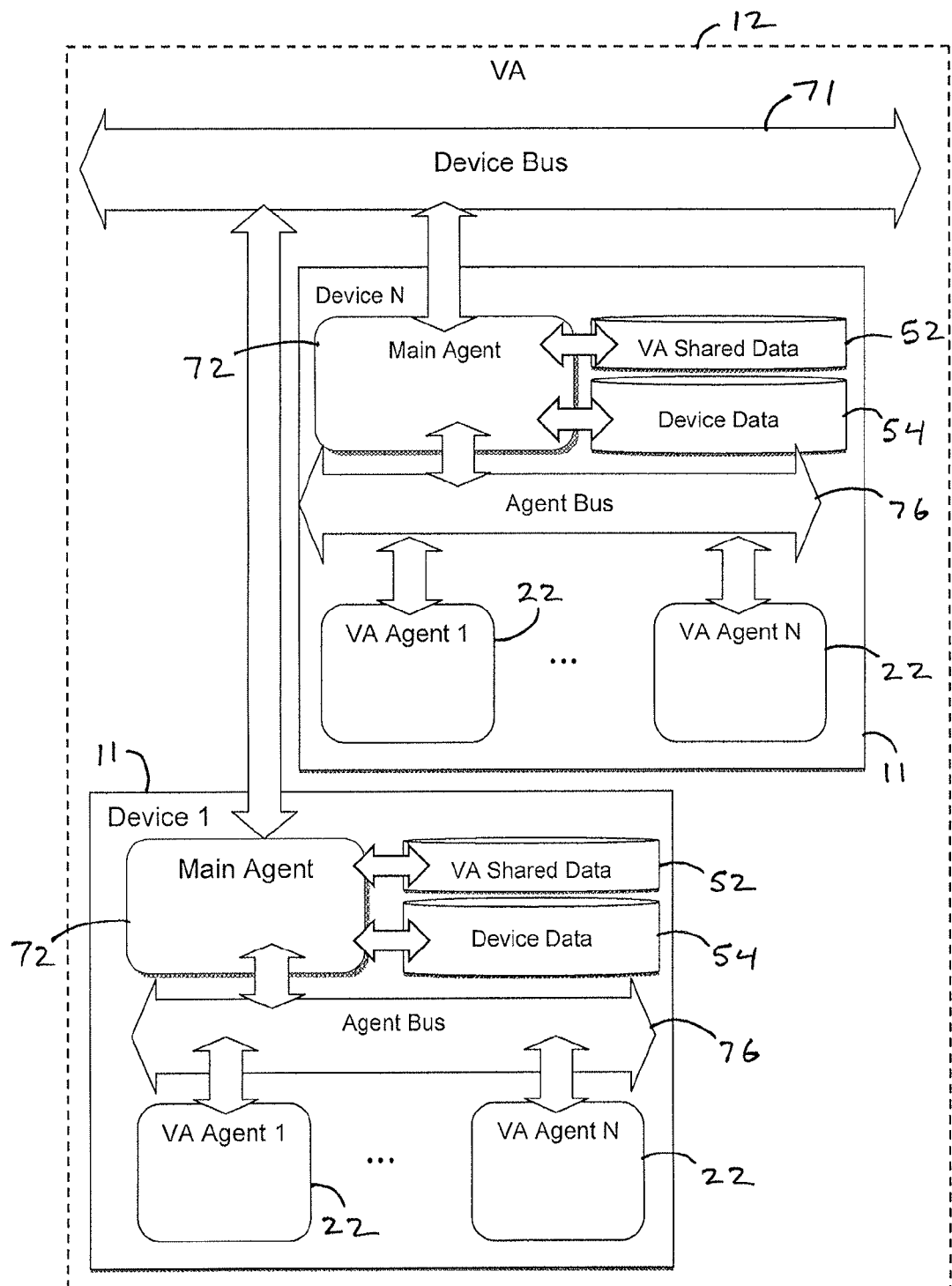
FIG. 8 is a schematic diagram of a virtual assistant platform in communication with main agents of a plurality of electronic devices.

Referring to FIG. 8, a plurality of devices 11 (i.e., Devices 1 . . . N) may each subscribe to a VA 12 that facilitates communication with each of the main agents 72 via a device bus 71. That is, each device 11 that subscribes to the VA 12 may have a main agent 72 that is dedicated to implementing the VA 12 on the device 11, and this main agent 72 communicates with the VA 12 via the device bus 71. The device bus 71 is a communication channel that may be dedicated to communications between main agents 72. The device bus 71 may also support communications between main agents 72 and the AVA 14 of the VAP 10 via the VA bus 74. Each main agent 72 may then deliver agent messages to the one or more agents 22 of the VA 12 on the device 11 (i.e., VA Agents 1 . . . N).

The VA shared data store 52 may be completely or partially replicated across all devices 11 that subscribe to the VA 12. Through this redundancy of shared data, processing may be partially or fully decentralized as agents 22 on any server or device 11 may operate autonomously upon the shared data it requires to do so. In some embodiments, each device 11 may have a VA shared data store 52 physically present on the device 11. In one embodiment, the VA shared data store 52 may contain only the shared data that is needed for operation of the VA 12 on the device 11. In other embodiments, each device 11 may contain a reference to a centrally stored VA shared data store 52. Each device 11 may also have one or more device data stores 54 as described above.

Figure 9:
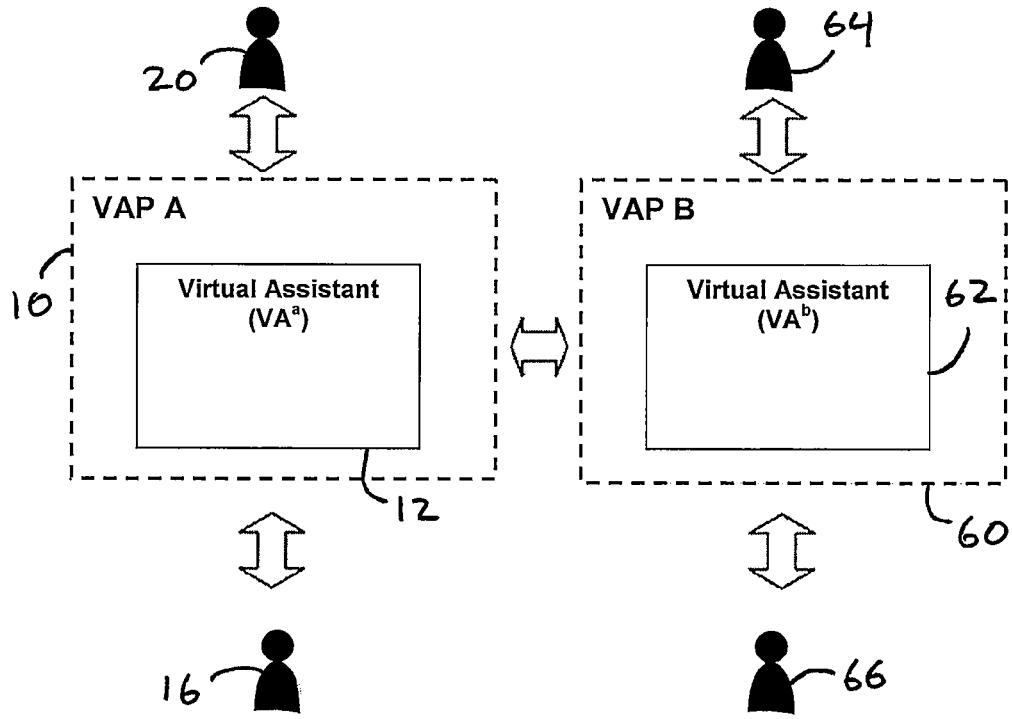
FIG. 9 is a schematic diagram of a communication flow between a plurality of personal virtual assistants in accordance with the present disclosure.

Referring to FIG. 9, the VA 12 may be configured to communicate with a second VA 62, which may be on the same VAP 10 as the first VA 12 or may be on a second VAP 60, unless communication between the VAPs 10, 60 or between the VAs 12, 62 is prohibited by one or both administrators 20, 64. For example, where the VA 12 and second VA 62 are on the same VAP 10, the VAP 10 may serve as a certificate authority or other security key provider to both VAs 12, 62. In another example, a user 16 of the first VA 12 may share a document with a user 66 of the second VA 62 by instructing its VA 12 to send the document to the second VA 62. This document transfer can require authentication of the second VA 62, such as by requiring the second VA 62 to visit a particular web address and provide a digital certificate or other security key.

Figure 10:
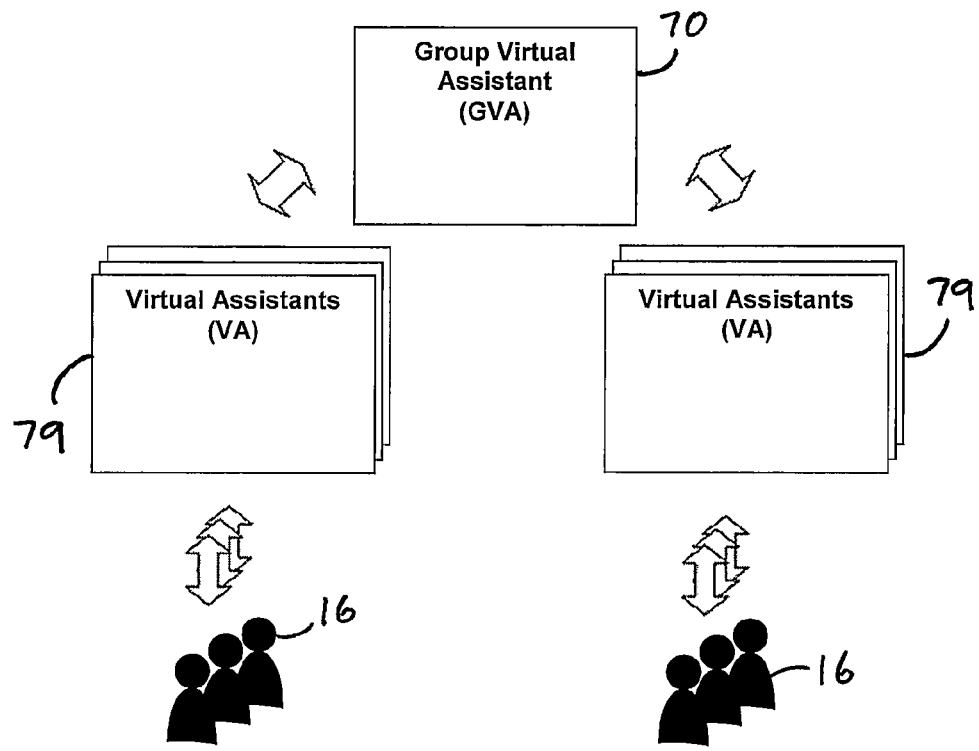
FIG. 10 is a schematic diagram of a communication flow between a group virtual assistant and a plurality of personal virtual assistants in accordance with the present disclosure.

Referring to FIG. 10, a group VA 70 may facilitate data exchange between a plurality of subscriber VAs 79. A group VA 70 may be advantageous in a VAP 10 implemented or used by an organization, such as a company, or by an individual in a head-of-household role where family members and devices in the home may use subscriber VAs 79. The group VA 70 may be configured to optimally distribute information between the subscriber VAs 79 by maintaining, such as in its VA shared data store 52, data describing the state of each subscriber VA 79 and its users 16. For example, a group VA 70 for an elementary school may track that a parent using a subscriber VA 79 has a child in Teacher A's second grade class and a child in Teacher B's fourth grade class. The group VA 70 may thereby send only relevant information to that parent's subscriber VA 79, such as general school information, information about second and fourth grade events, and information about Teacher A's and Teacher B's classes. A group VA 70 and any of its subscriber VAs 79 may reside in the same VAP 10 or in different distributed VAPs.

Figure 11:
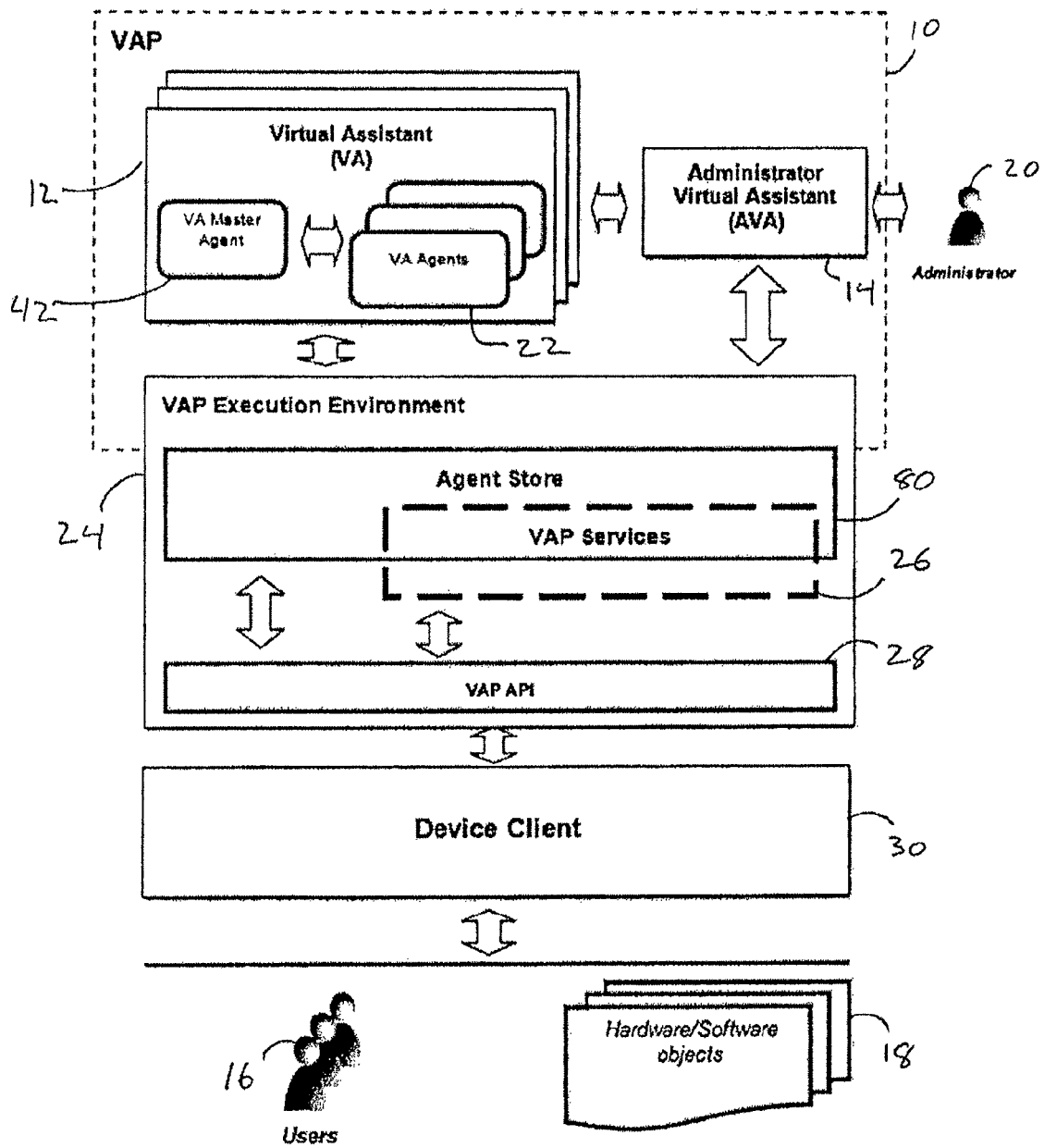
FIG. 11 is a schematic diagram of a system implementing a virtual assistant platform and an agent store in accordance with the present disclosure.

Referring to FIG. 11, the execution environment 24 of the VAP 10 may include an agent store 80, which may be a software component for managing the agents 22 and composite agents 40 that the device client 30 may utilize. The agent store 80 may implement one or more of the VAP-implementation services 26, including, without limitation: registering new agents 22 within the VAP 10 to make them available for retrieval and use by device clients 30 and other VAP 10 users 16; before or in conjunction with registering an agent 22, digitally certifying the authenticity of the agent 22, such as by signing the agent 22 as a Certification Authority; hosting agents 22, including locally or remotely storing code and data pertinent to an agent 22; authorizing distribution of an agent 22 to a user, and transmitting the agent 22 to the user 16; packaging a plurality of agents 22 into an agent package, which can be digitally certified and distributed like an agent; maintaining a catalog or database describing all available agents 22; facilitating financial processing of agent-related transactions, including purchasing of agents 22 and handling transactions initiated by agents 22; certifying and distributing data associated with an agent 22 or with a type, group, package, or classification of agents 22.

The agent store 80 may interface with a user 16, directly or through a device client 30, to allow the user 16 to expand its use of the VAP 10 by adding VAs 12 or agents 22. A user 16 may access the agent store 80 to acquire a new VA 12 or agent 22, which may be available for free or fee-based acquisition. The agent store 80 may provide an agent catalog for the user 16 to search. In this manner, the user 16 may personalize his own experience with the VAP 10 by setting up one or more VAs 12 with agents 22 specific to his needs. For example, an interior designer may acquire a VA 12 configured to access one or more private or public design-relevant information sources, such as the website of INTERIOR DESIGN MAGAZINE, YELP pages and TWITTER accounts of local interior designers, or the interior designer's PINTEREST account, and display new posts to the designer's device. The interior design-specific VA 12 may further be configured to exchange information with a group VA 70 that connects the interior designer's VA 12 with VAs of other users 16 interested in interior design. The VAs 12 or agents 22 available through the agent store 80 may be updated individually, collectively in subsets, or collectively as a whole, depending upon the type of update. For example: a single agent 22 may be updated with a new rule set; a group of agents 22 making up a VA 12 may be updated collectively to add new functionality to the VA 12; or, all of the agents 22 in the agent store 80 may be updated collectively to reflect changes to the VAP 10.

Figure 12:
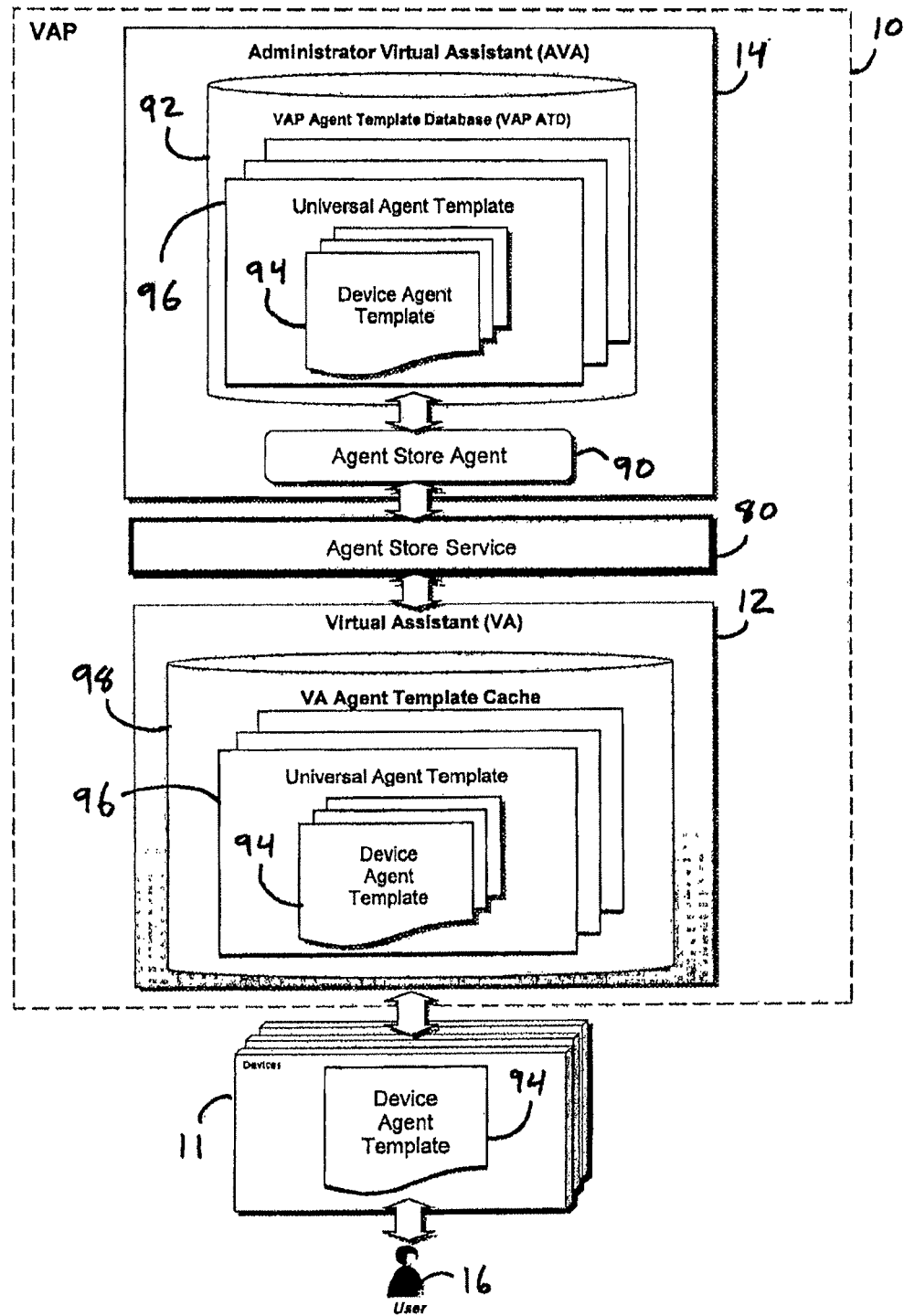
FIG. 12 is a schematic diagram of a virtual assistant platform with an agent store in accordance with a first embodiment of the system of FIG. 11.

Referring to FIG. 12, the AVA 14 of a VAP 10 may coordinate the distribution of agents 22 through the agent store 80 to one or more VAs 12 using an agent store agent 90. The agent store agent 90 may be an agent 22 as described above, specially configured to access a VAP agent template database ("ATD") 92 stored by the AVA 14. The VAP ATD 92 may be a database or other data store that contains agent templates for the agents 22 available to all VAs 12 on the VAP 10 through the agent store 80. An agent template is an installation package containing all data, software, and firmware modules that the associated agent 22 requires to operate on one or more devices. The agent template may include, without limitation: agent code, such as precompiled source code modules for execution on a physical or virtual machine, or software modules such as device drivers for executing the agent in specific operating systems or other execution environments; software installation modules; data, such as databases, files, operating rule sets, permissions, and the like; and metadata, such as knowledge about other agent templates, knowledge about hardware or software requirements of the target device, or versioning and security information, such as digital certificates authenticating the agent template and its components. Agent templates in the VAP ATD 92 may include device agent templates 94, which are agent templates designed for a specific type of device (i.e. Windows desktop computer, iOS device), and universal agent templates 96, which are packages containing all of the agent device templates 94 for a particular agent 22.

In order to take advantage of the agent templates, each VA 12 may maintain an agent template cache 98. The agent template cache 98 contains one or more agent templates for each agent 22 that has been added to the VA 12 as described above. In some embodiments, as illustrated, the agent template cache 98 may contain the universal agent template 96 and its corresponding device agent templates 94. The VA 12 may then distribute the proper device agent template 94 for a particular device 11 to the device 11 as described further below. The agent template cache 98 may be a database or data store that stores an exact copy of each agent template that the VA 12 receives from the AVA 14. Alternatively, the agent template cache 98 may be a list of references, such as location pointers, to the relevant agent templates that are stored in the VAP ATD 92 or another ATD as described below.

Use of the agent 22 within a VA 12 may include discovery, delivery, and updating of the agent 22. The availability of the agent 22 is discovered through an external event, such as an action by the user 16, an object 18, or another agent 22. The VA 12 may identify that the agent 22 is available by communicating with the agent store 80 and receiving confirmation that at least one agent template for the agent 22 is in the VAP ATD 92. The VA 12 then requests the agent store 80 to download the corresponding agent template, particularly the universal agent template 96 if one exists. The agent store 80 instructs the agent store agent 90 to retrieve the requested universal agent template 96, by which the agent store agent 90 may make and return a copy of the universal agent template 96 or may return a reference to the universal agent template 96 in the VAP ATD 92. The VA 12 receives the universal agent template 96 from the agent store 80 and stores the universal agent template 96 in the agent template cache 98. The VA 12 may proceed to install the universal agent template 96 on the target device 11, or may wait for a device installation event, such as power-on or power-off of the device 11, connection of the device 11, or expiration of a time, to occur.

When it is time to install the universal agent template 96, the VA 12 selects the proper device agent template 94 for the device 11 and transfers the device agent template 94 to the device 11. The device client 30 on the device 11 may receive the device agent template 94, and may concurrently or subsequently receive a command to install the agent 22. The device client 30 then installs the agent 22 according to the instructions and data in the device agent template 94 and notifies the VA 12 when the installation is complete. Subsequent updating of the agent 22 may be required when a new version of the agent template becomes available. The AVA 14, through the agent store agent 90, may notify any VA 12 that had previously downloaded the agent 22 that a new version of the agent 22 is available. The VA 12 may then initiate a download and installation of the new version as described above.

Figure 13:
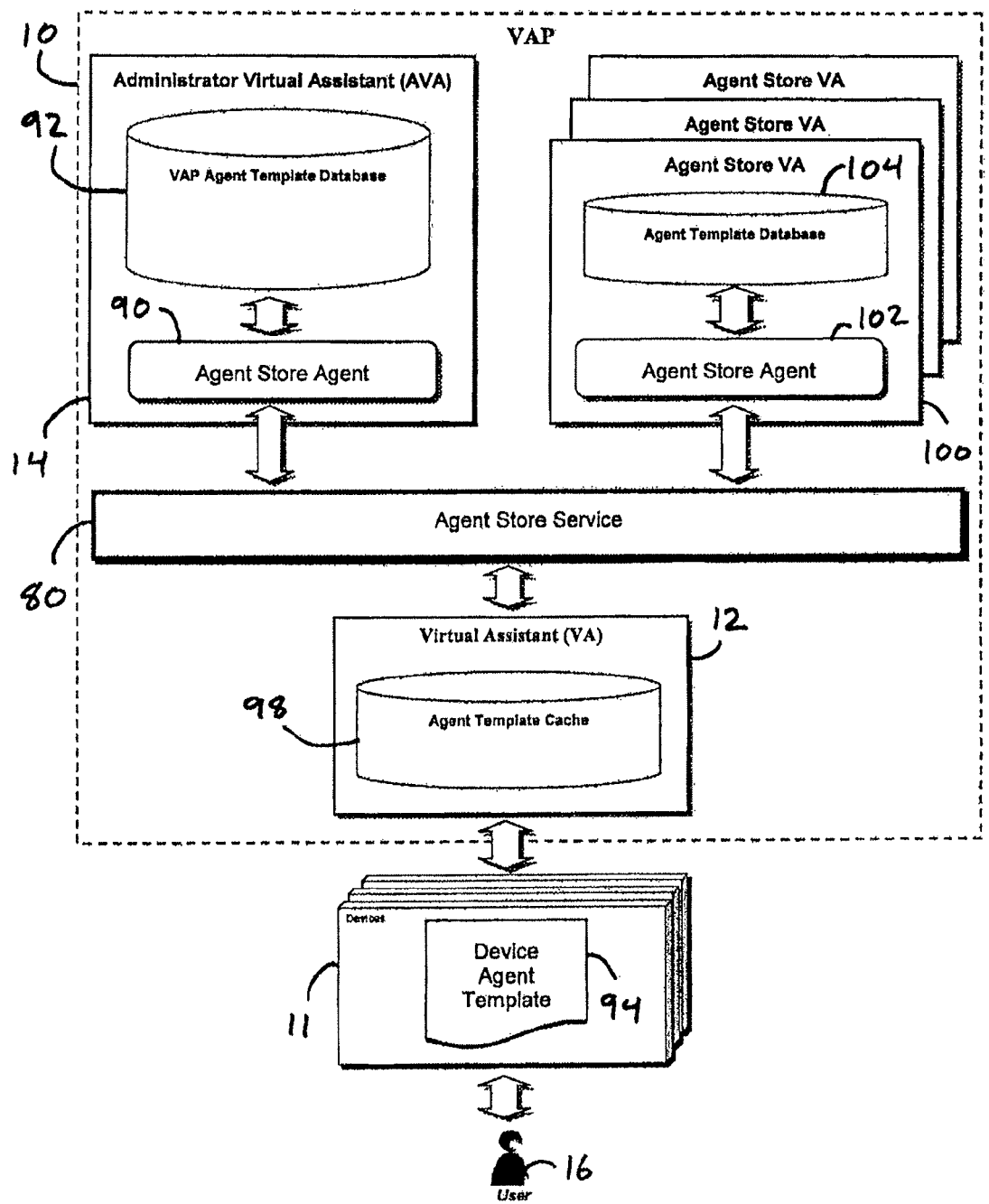
FIG. 13 is a schematic diagram of a virtual assistant platform with a plurality of agent stores in accordance with a second embodiment of the system of FIG. 11.

Referring to FIG. 13, the VAP 10 may include one or more agent store VAs 100 that are individually configured to provide their own agents 22 to other VAs on the VAP 10 through the agent store 80. Each agent store VA 100 may include its own agent store agent 102 and ATD 104 that function analogously to the agent store agent 90 and VAP ATD 92 maintained by the AVA 14. That is, the ATD 104 stores agent templates for the agents 22 on the agent store VA 100, and the agent store agent 102 retrieves and distributes the agent templates in response to requests from the agent store 80. The agent templates of the ATDs 104 are stored, discovered, delivered, installed, and updated on VAs 12 and devices 11 as described above.

Figure 14:
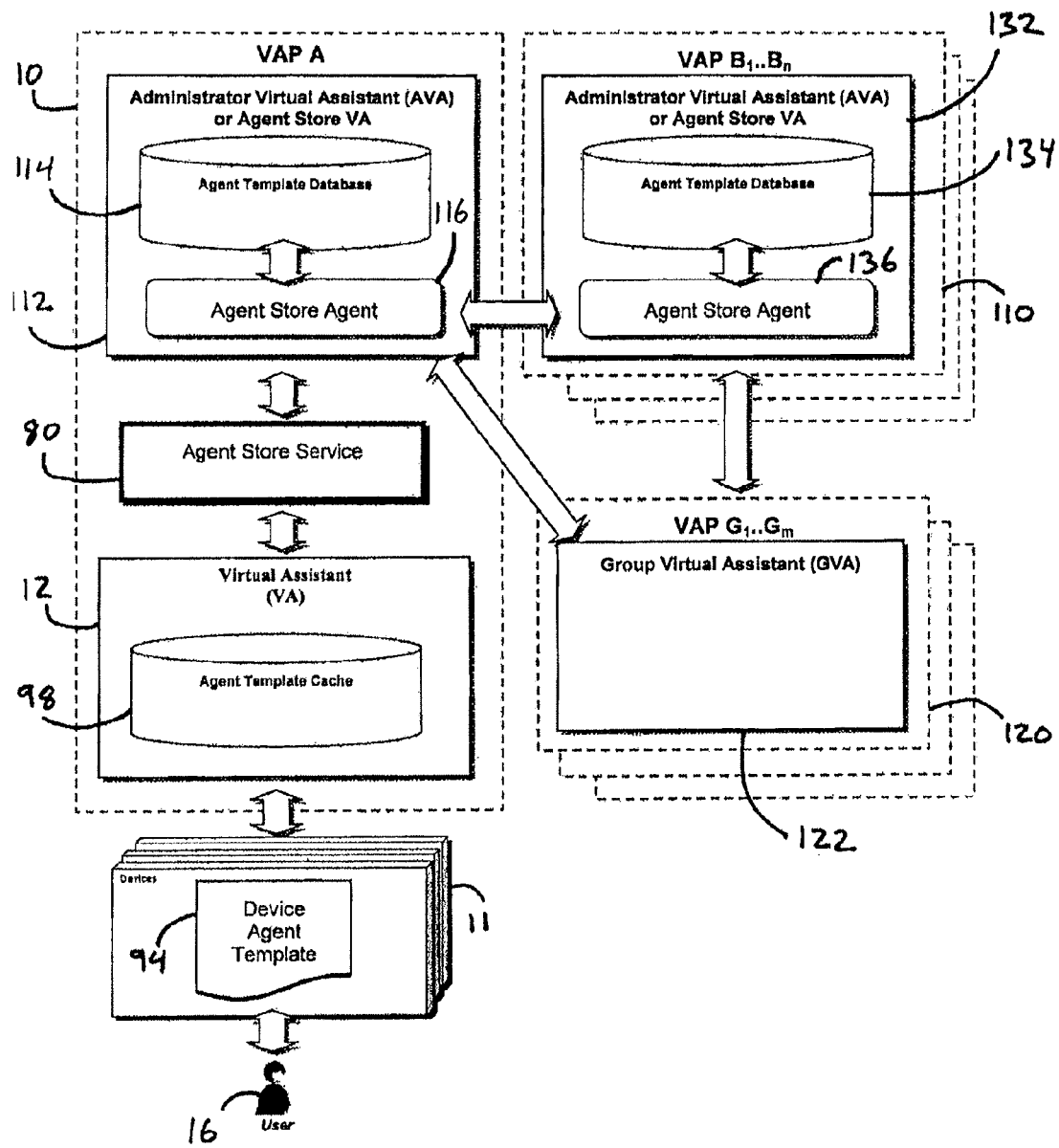
FIG. 14 is a schematic diagram of a virtual assistant platform with a distributed agent store in accordance with a third embodiment of the system of FIG. 11.

Referring to FIG. 14, the agent store 80 may provide access to agents 22 that are distributed across a plurality of VAPs 10, 110, 120. Distribution of agents 22 from a store-enabled VA 112, such as the AVA 14 or agent store VA 100, to VAs 12 within the same VAP 10 may proceed as described above. Further, the store-enabled VA 112 of a first VAP 10 may serve as a proxy to provide VAs 12 of its VAP 10 with access to agent templates stored in the ATD 134 of a store-enabled VA 132 on a second VAP 110. The agent templates in the ATD 134 on the second VAP 110 may be accessed directly by VAs 12 through communication between the agent store agents 116, 136 of the store-enabled VAs 112, 132 on each VAP 10, 110. For example, the agent store agents 116, 136 may negotiate a secure connection and then provide agent discovery and delivery services, as described above, upon receiving a request for an agent 22 from a VA 12.

In some embodiments, the agent templates in the ATD 134 on the second VAP 110 may be accessed indirectly by VAs 12 through connection of the first VAP 10 and second VAP 110 to one or more group VAPs 120. The store-enabled VA 112 of the first VAP 10 may subscribe to a group VA 122 in the group VAP 120. The store-enabled VA 132 of the second VAP 110 may subscribe to the same group VA 122, and may therethrough be registered with the group VAP 120 as a store-enabled VA. Such registration makes the agent templates in the ATD 134 available to all subscribing VAs of the group VA 122. The agent 22 availability may appear seamless to the user 16. That is, the user 16 gains access to all agents 22 through the VA's 12 communication with the agent store 80 on its own VAP 10, regardless of which VAP is providing the available agents 22.

Figure 15:
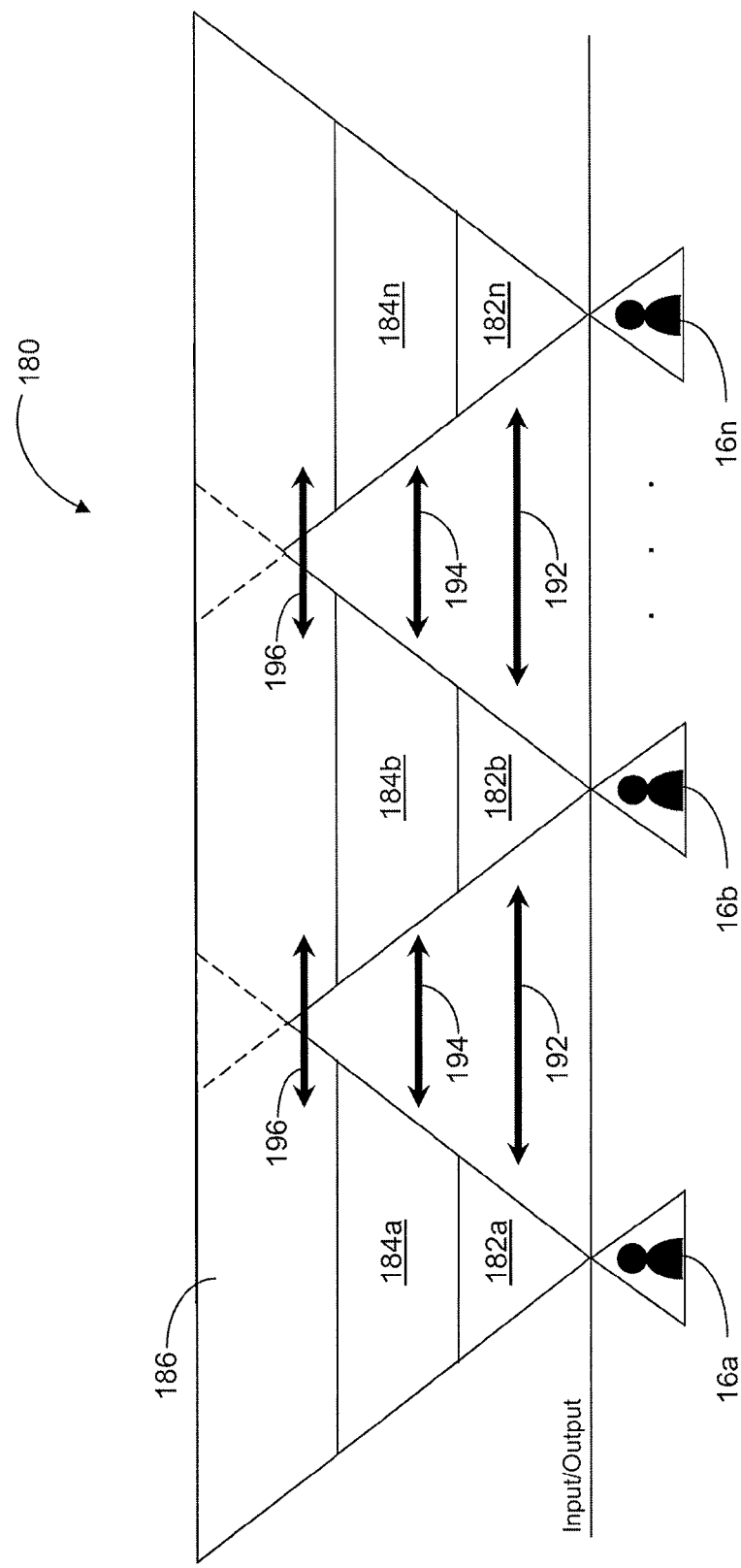
FIG. 15 is a schematic diagram of a hierarchical arrangement of virtual assistant platforms.

Referring to FIG. 15, a distributed system 180 of VAPs may be configured in a hierarchy to provide a user 16a . . . n with increasing levels 182a . . . n, 184a . . . n, 186 of inter-networking with the other users 16a . . . of the system 180 (where n is a critical number of users 16 that can be supported by the system 180). At a personal level 182a . . . n, the user 16a . . . may use a personal VA 12 to access all or a subset of the features of the VAP 10, the features pertaining to private or otherwise isolated data (i.e. "personal features"). The personal features may be device-centric, such as using the VA 12 to change the settings on a smartphone. The personal features may access or manipulate completely private data, such as personal financial accounts or sensitive documents. The personal level 182a . . . may be isolated from any public or semi-private network, either by severing any communication channel with such networks, or by application of a security protocol to prevent access to the personal level 182a . . . n from any VA 12 other than the user's personal VA 12. Additionally, one or more security protocols as described above may be implemented to allow the VA 12 of one user 16a to communicate directly with the VAs 12 of other users 16b . . . n at the personal level 182a . . . n, as illustrated by arrow 192.

A group level 184a . . . n may include one or more group VAs 70 as described above, wherein the user 16a has a subscriber VA 79 to each of the group VAs 70 in his group level 184a. A particular group VA 70 may therefore be included in the group level 184a . . . n for every user 16a . . . n that subscribes to that group VA 70. The user's 16a subscriber VA 79 may be the user's personal VA 12, and may therefore be configured to access the personal level 182a as well as the group level 184a. Or, the subscriber VA 79 may be another VA 12 separate from the personal VA 12 and may be prevented from accessing the personal level 182a. Arrow 194 indicates that information, tasks, and agents may be shared between the users' 16a . . . n hierarchies at the group level 184a . . . n by way of the users' 16a . . . n subscriptions to common group VAs 70. That is, if a first user 16a and a second user 16b subscribe to the same group VA 70, each user's 16a,b VAP 10 may allow interactions between the first user's 16a VAs 12 and the second user's 16b VAs 12 as permitted at the group level 184a,b. Furthermore, a group VA 70 may also be a subscriber VA 79 to one or more other group VAs 70 to facilitate interactions at the group level 184*a* . . . *n*. Group VAs 70 may subscribe to each other.

Group level 184*a* . . . *n* interactions may include those interactions described above with respect to group VAs 70. In particular, and by way of example, the group VA 70 may run any suitable number of agents 22 (or composite agents 40) and therefore, it may coordinate many types of information acquisition, storing, processing and sharing functions via custom APIs 29. The group VA 70 may thereby be an active participant of the scheme, with group-level functions that benefit its subscriber VAs 79, such as collecting knowledge (i.e., "learning" rules and facts) from individual subscribers, analyzing and storing the knowledge, and sharing information derived from the knowledge with other subscribers thus growing everybody's knowledge (i.e., "teaching" the rules and facts). However, each user's 16*a* . . . *n* hierarchy can remain at least partially isolated from those of the other users 16*a* . . . *n* as illustrated, though security measures as described above regarding group VAs 70. In particular, the hierarchies of two users 16*a*, 16*n* that do not subscribe to any common group VAs 70 may remain completely isolated from each other at the group level 184*a,n* and below. Furthermore, aside from two users' 16*a,b* common subscription to a particular group VA 70, a user 16*a* may be prevented from discovering or accessing other group VAs 70 in the other user's 16*b* group level 184*b*.

A networking level 186 may provide access to additional interactions between users 16*a* . . . *n*. The networking level 186 may include one or more networks that are accessible by each VAP 10. A network in the networking level 186 may be an existing or non-VAP-native user network, such as FACEBOOK or another social network. For such networks, one or more VAPs 10 may be configured with one or more APIs to access the network accounts of each user 16*a* . . . *n*. A network may also be a VAP-native network, such as an emergent network implemented by one or more VAPs 10 within one or more software frameworks, one or more hardware frameworks, or a combination thereof. Such an emergent network may be accessible only by users 16*a* . . . *n* that engage their personal VAs 12 or another VA 12 to participate in the system 180 at the network level 186. Such engagement may be done directly by the user, or indirectly through the user's subscription to a group VA 70 that participates at the network level 186. In this manner, a node representing the user 16*a* is added to the emergent network when the user 16*a* initiates participation at the network level 186. Pathways to other nodes in the emergent network may be formed depending on information within the lower levels (i.e. group level 184*a* and/or personal level 182*a*) of the user's 16*a* hierarchy, provided the user 16*a* authorizes the information to be accessible at the networking level 186.

Any network that is accessible to a user 16*a* . . . *n* through a VAP 10 may be included in the networking level 186, including networks that the user can access only through subscription to a particular group VA 70. The overlap of user hierarchies at the networking level 186 represents a connection between the users at the networking level 186. The connection is created by both users' 16*a,b* acquiescence to being so connected, such as when the users 16*a,b* add each other as "friends" on FACEBOOK. Arrow 196 indicates that information, tasks, agents, and the like can be shared between users 16*a* . . . *n* connected at the networking level 186. Further, such information, tasks, agents, and the like from a first user 16*a* may be accessible by a second user 16*b* even if such information was not accessible by the second user 16*b* at a lower level of the hierarchy (i.e. group level 184*a,b*), provided such access is authorized by the first user 16*a*. For example, by connection at the networking level 186, the second user 16*b* may be able to see a list of all group VAs 70 to which the first user 16*a* subscribes. The second user's 16*b* VA 12 can use this information to determine if the second user 16*b* might be interested in joining any of the first user's 16*a* group VAs 70 to which the second user 16*b* does not presently belong.

Using the distributed nature of the VAPs 10 as described, a VA 12 or group VA 70 may automatically perform functions that would otherwise require a high level of skill in computer science and computer information management. For example, using the interconnected VAPs 10 a group VA 70 may manage a pool of resources that contains all of the resources related to the available computing power of devices 11 registered with the group VA's 70 subscriber VAs 79. Users may donate or sell their unused resources, such as in the form of computing power or parallel processing time, to the group VA 70 for distribution via the pool. Other subscriber VAs 79 may automatically acquire resources from the pool to perform complex computing tasks, such as to perform calculations for weather forecasting, medical data review, and the like. Users 16*a* . . . *n* may be able to store some of their data on other devices 11 that have excess capacity, and the VAP 10 may implement common data encryption models to maintain consistent encryption of data over different types of devices 11 and operating systems.

Figure 16:
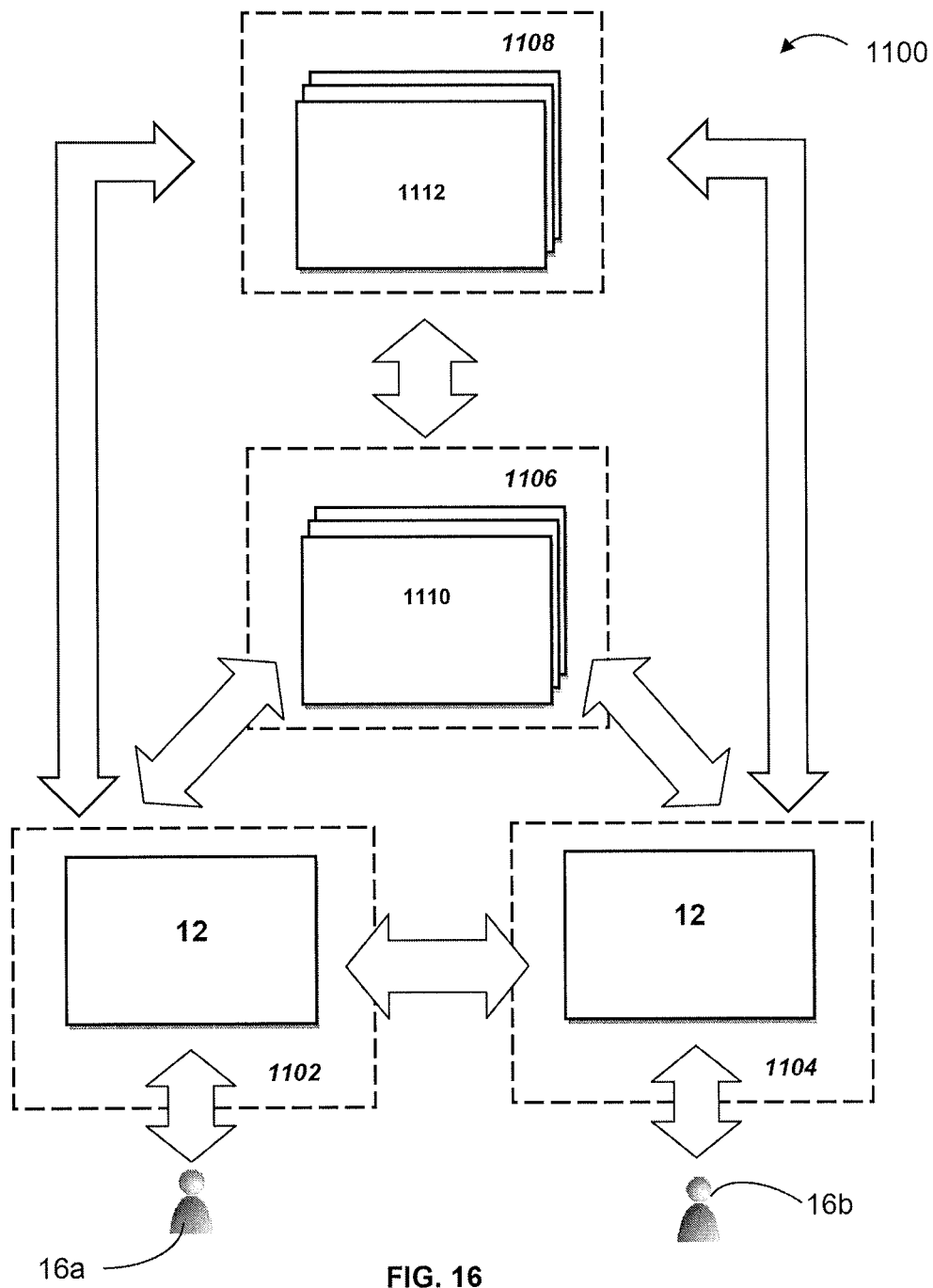
FIG. 16 is a schematic diagram of a distributed mesh arrangement of virtual assistant platforms.

FIG. 16 illustrates an example distributed VAP system 1100 where the VAPs 1102, 1104, 1106, 1108 are internetworked in a partially or fully connected mesh topology. A first VAP 1102 may operate a VA 12 for a first user 16*a*, a second VAP 1104 may operate a VA 12 for a second user 16*b*, and so on in a manner similar to the personal level 182*a* . . . *n* of interaction described with respect to FIG. 15. The VAPs 1102, 1104 may be configured to allow the VAs 12 of the users 16*a,b* to interact with each other. The VA 12 of each user 16*a,b* may subscribe to one or more group VAs 1110 that operate on a third VAP 1106. The VAs 12 may interact with each other through the group VAs 1110 according to parameters that may be the same or different as parameters set by the VAPs 1102, 1104 for direct interaction of the VAs 12. The VA 12 of each user 16*a,b* may further subscribe to additional group VAs 1112 that operate on a fourth VAP 1108. The VAs 12 may interact with each other through the group VAs 1112 according to parameters that may be the same or different as parameters set by the VAPs 1102, 1104 for direct interaction of the VAs 12.

Furthermore, one or more of the group VAs 1110 of the third VAP 1106 may subscribe to one or more of the group VAs 1112 of the fourth VAP 1108. Such interconnectivity may provide additional functionality to the VAs 12 for their interactions with each other and with the group VAs 1110, 1112 to which they subscribe. For example, the distributed VAP system 1100 may implement a social network, similar to FACEBOOK, but wherein groups are active rather than passive. That is, users of FACEBOOK can join a group by subscribing to the group's profile page. However, the profile page does not process any data beyond receiving input from a subscribing user and then displaying that information to other users. In contrast, the group VAs 1110, 1112 may actively process data in the same manner as a user's personal VA 12. For example, group VAs 1110, 1112 can filter spam or malware, provide additional encryption, perform particular group-relevant tasks with agents 22, and the like. Additionally or alternatively, a group VA 1110, 1112 may manage one or more social network accounts, rather than itself being a component of a social network. For example, the group VA 1110 may create and manage a FACEBOOK account for every one if its subscribers, or may create a group FACEBOOK account that may be accessed by all of the group VA's 1110 subscribers. Group VAs 1110, 1112 may be implemented on any suitable computing environment, regardless of computing power, operating system, and the like.

Figure 17:
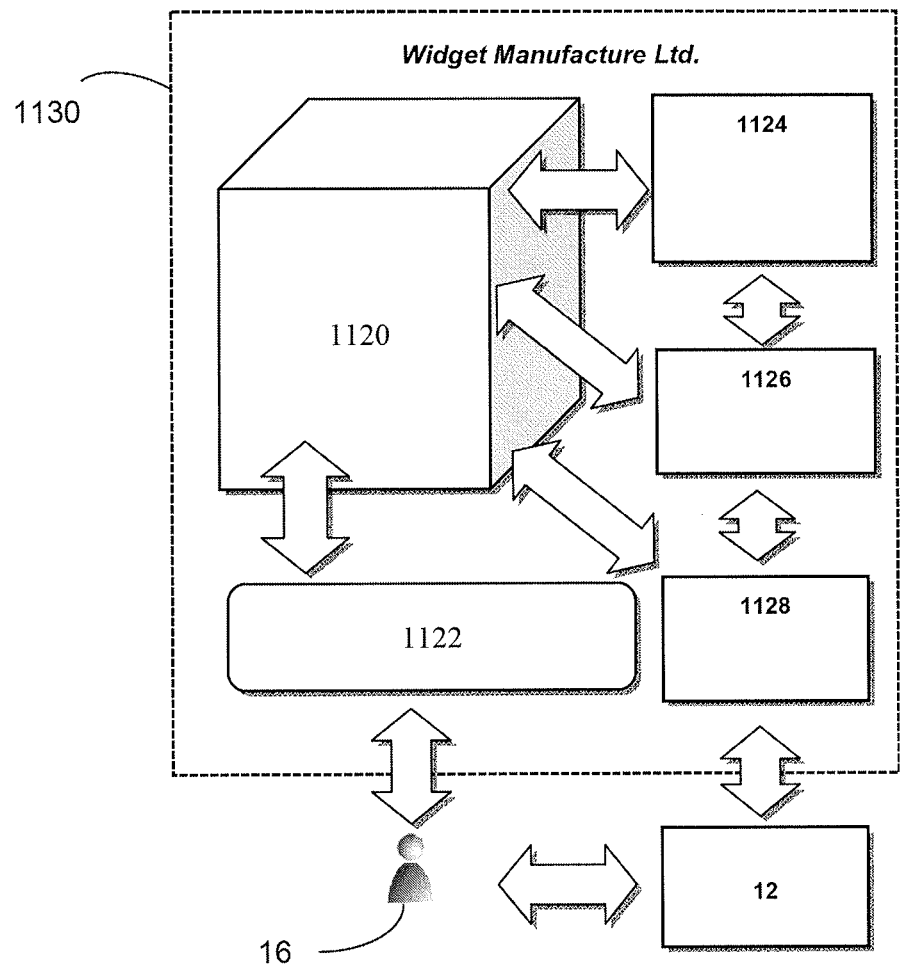
FIG. 17 is a schematic diagram of a company virtual assistant platform.

Referring to FIG. 17, an exemplary embodiment of a company VAP 1130 may be used for communications internal to a company (e.g. Widget Manufacture Ltd.). A user 16 may be an employee of the company, and may typically access company resources 1120 via one or more company interfaces 1122. Company resources may include information stored in data stores, as well as buildings, equipment, hard documents, employees, information technology staff, and the like. The company interfaces 1122 are means for the employee to gain access to the company resources 1120, and may be an office space, a website, a virtual private network, or a virtual presence system such as a videophone framework. In addition to the standard access means, the company VAP 1130 may support the user's 16 VA 12, which may gain access to the resources 1120. Such access may be through agents operating on the personal VA 12. In some embodiments, the VAP 1130 may include one or more company VAs 1124, 1126, 1128, which may be group VAs 70 as described above.

All of the company VAs 1124, 1126, 1128 may be implemented on the same VAP 1130 or on different VAPs. The company VAs 1124, 1126, 1128 may interact with each other, with the company resources 1120, and with any subscriber VAs 79, be they employee personal VAs 12 or other VAs. In one example, the company VA 1128 configured to communicate directly with the employee user's 16 VA 12 may be a human resources group VA that provides the employee with access to company resources and information, delivers urgent notifications to the user's 16 device, and traces employee physical locations. In another example, The company VA 1128 that directly communicates with the VA 12 may be an employee VA (EVA) that is designed to assist humans in a specified company role or position. When a new person is hired, his VA 12 is connected to the EVA, allowing all the company related information to be delivered and stored at the user's 16 EVA and not his personal VA 12. For example, the EVA may communicate with another company VA 1126 that is the human resources group VA described above. When the EVA needs to know the user's 16 whereabouts or needs to deliver a note to the user 16, it can ask the VA 12 to execute these activities. All work items which the user 16 creates, all work related communication he ever has, all the rules which EVA acquired during communication with the user 16 during his time at the company are stored at EVA. When the user 16 gets promoted or leaves the company all this data can be easily transferred to his successor. In some embodiments, another company VA 1124 may be a primary VA that interacts with one or more of the EVA and human resources group VA, and may manage all company's digital resources, execute some business processes, which can be automated, represent company in outside communications, and perform other tasks.

Figure 18:
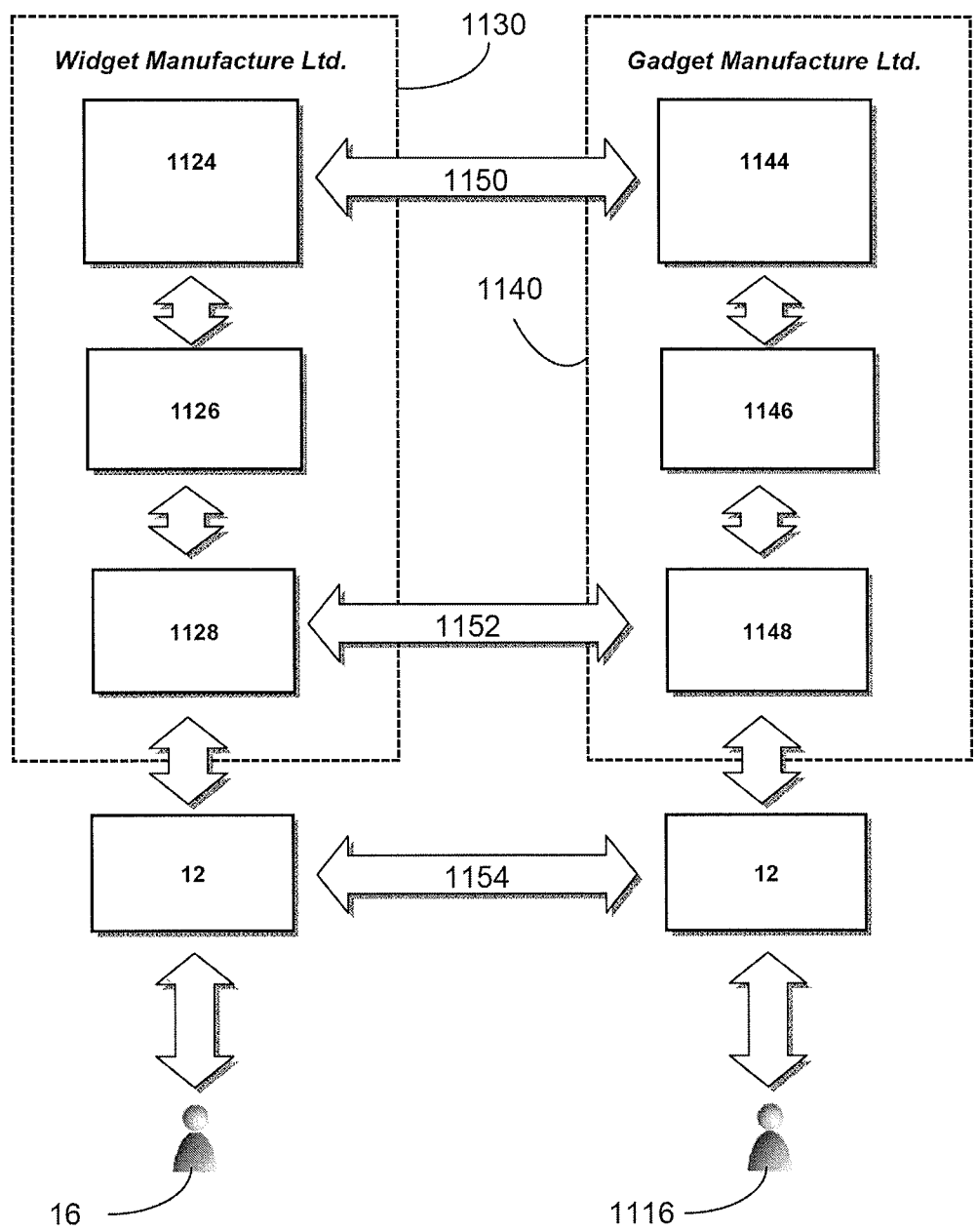
FIG. 18 is a schematic diagram of two company virtual assistant platforms interacting with each other.

Referring to FIG. 18, the company VAs 1124, 1126, 1128 of the company VAP 1130 may further communicate with the company VAP 1140 of another company (e.g., Gadget Manufacture Ltd.). In the exemplary embodiment, the second company VAP 1140 has company VAs 1144, 1146, 1148 that are analogous to the company VAs 1124, 1126, 1128 of the first company VAP 1130 to illustrate several levels of communication between the company VAPs 1130, 1140. At one level, denoted by arrow 1150, the primary VAs 1124, 1144 may communicate to share company resources, pass messages, and the like. At another level, denoted by arrow 1152, employee VAs 1128, 1148 may communicate with each other to facilitate collaboration between employees of the different companies. At another level, denoted by arrow 1154, the personal VAs 12 of users 16, 1116 may communicate to share personal, non-work-related information.

Figure 19:
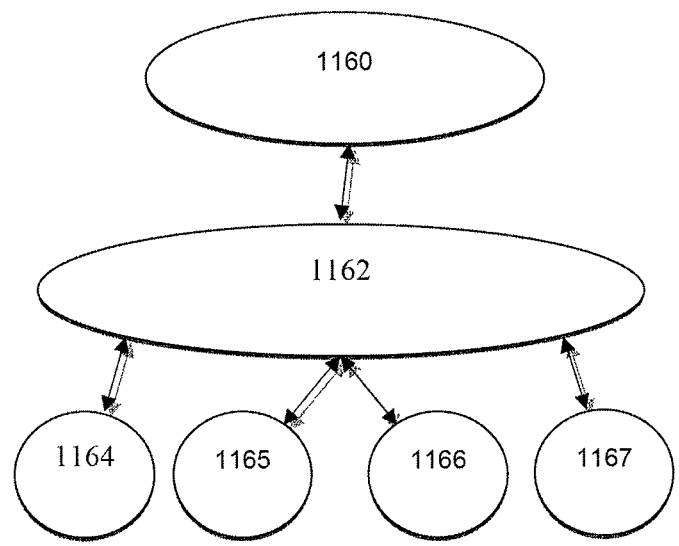
FIG. 19 is a schematic diagram of a product support infrastructure on a virtual assistant platform of the present invention.

Referring to FIG. 19, distributed VAPs according to the present invention may support an open-source or commercial product with an infrastructure for end-users to use their VAs 1164-1167 in conjunction with the product. In some embodiments, the VAs 1164-1167 can be subscribed to a subset GVA 1162, which in turn is subscribed to a base GVA 1160 for the product. The base GVA 1160 can provide technical support and collect information from the subset GVA 1162 and VAs 1164-1167. The subset GVA 1162 can provide specialized services to the VAs 1164-1167 in correspondence to a relevant subset. The subset GVA 1162 can further facilitate communications between VAs 1164-1167 as described above. Finally, the subset GVA 1162 can collect data from its subscribing VAs 1164-1167 in order to share usage patterns and knowledge with all users.

In one example, the base GVA 1160 can be a MICROSOFT WINDOWS GVA that offers updates to the WINDOWS operating system for devices that run the VAs 1164-1167. The subset GVA 1162 can be "Windows for Secretaries," which invites professional secretaries to subscribe their VAs 1164-1167 to the subset GVA 1162. Thus, a user who is a secretary can have an agent 22, which is running on her PC desktop and monitors her actions and provides solutions to common problems. The secretary chooses to share knowledge, which her VA 1164 has learned while working with her, with "Windows for Secretaries" subset GVA 1162. "Windows for Secretaries" GVA 1162 constantly receives data from its subscribers (who are mostly secretaries). It analyses the data and shares most useful patterns with all subscribers. The "Windows for Secretaries" GVA 1162 is also subscribed to "Microsoft Windows" GVA 1160 and transfers information collected from users to Windows Group where it is analyzed at technical level.

Figure 20:
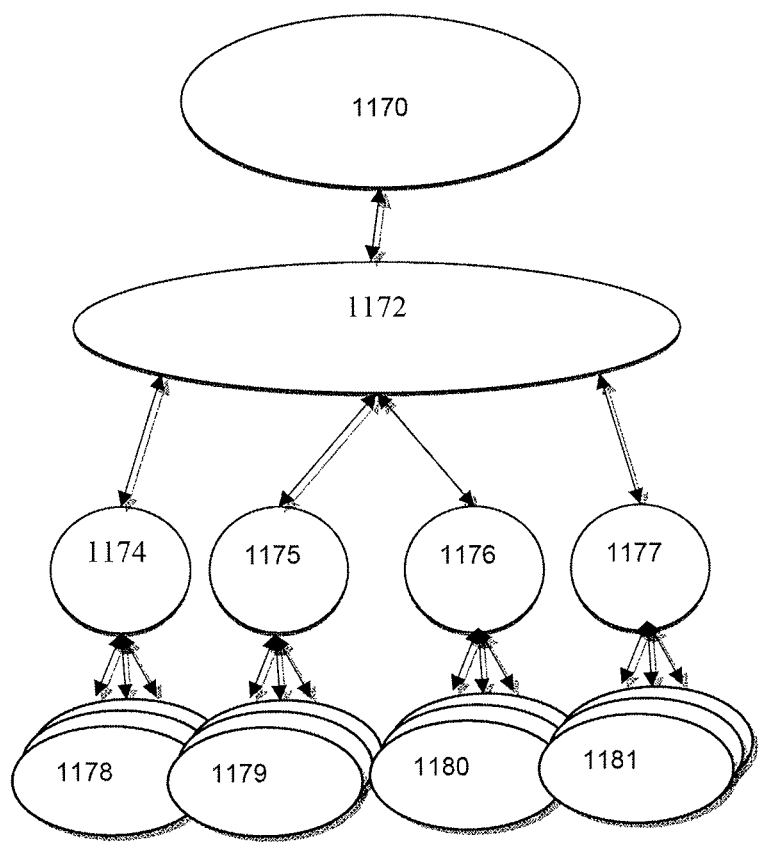
FIG. 20 is a schematic diagram of sensor information processing infrastructure on a virtual assistant platform of the present invention.

Referring to FIG. 20, the distributed VAPs of the present invention may support a sensor sharing scheme to collect sensor information from users or objects process it, and deliver it back to the users or other users. As in the embodiment of FIG. 19, the scheme can include a base GVA 1170 to which a subset GVA 1172 subscribes. The base GVA 1170 may be configured for high-level or widely-distributed sensor data analysis, while the subset GVA 1172 may be a more localized sensor data analysis group. Users can subscribe their VAs 1174-1177 to the subset GVA 1172 and can also receive services from the base GVA 1170. The VAs 1174-1177 may be configured to interact with one or more sensors 1178-1181 or sensor groups, and receive sensor data from the sensors 1178-1181. This data can then be transmitted to the subset GVA 1172, base GVA 1170, and other VAs 1174-1177 as described above.

In an example implementation, the sensor sharing scheme can be used to collect and distribute weather-related parameters. In this example, a user has a plurality of sensors 1178 connected to his Home VA 1174, which, besides other things, can measure temperature, pressure, and humidity at the user's home location. The user subscribes his VA 1174 to "Local Weather Monitoring" GVA 1172. This GVA 1172 collects sensor data from all local subscribers' VAs 1174-1177 and can process the data and deliver to the VAs 1174-1177 a detailed, up-to-date local forecast using this data. The "Local Weather Monitoring" GVA 1172 delivers the collected sensor data to a "Global Weather Monitoring" GVA 1170, which has more robust data and processing resources. The "Global Weather Monitoring" GVA 1170 produces a better overall weather forecast using the newly available local data from the VAs 1174-1177.

In another example implementation of the sensor sharing scheme, it can be used to collect health parameter data from sensors worn on a user's body. In this example, the user's VA 1175 is constantly monitoring his body sensors 1179. The user subscribes his VA 1175 to "Local Health Practice" GVA 1172. This GVA 1172 collects such data from sensors 1176, 1177 worn by other local users. The user's doctor can subscribe his VA to the "Local Health Practice" GVA 1172, and the user can grant his doctor's VA permission for the doctor to see his sensor 1179 data. The "Local Health Practice" GVA 1172 is constantly monitoring all the results from all the sensors 1178-1181 from all subscribers, and it can catch emergencies or slight abnormalities using rules which are provided by a global "FDA Approved Health Monitoring" GVA 1170. The "Local Health Practice" GVA 1172 can send anonymized patient information to the "FDA Approved Health Monitoring" GVA 1170, and receives back rules and alerts which a doctor subscriber to the subset GVA 1172 can execute to make sure his patients are OK.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Finally, it is expressly contemplated that any of the processes or steps described herein may be combined, eliminated, or reordered. Accordingly, this description is meant to be taken only by way of example, and not to otherwise limit the scope of this invention.

What is claimed is:

1. A system for providing electronic assistance to a plurality of users, the system comprising:
   a first hardware computing device coupled to a network and executing a first set of specific computer-executable instructions that, when executed, cause the first hardware computing device to operate one or more virtual assistant platforms;
   a plurality of virtual assistants located within a second hardware computing device coupled to the network and executing a second set of specific computer-executable instructions, including a device client software installed on the second hardware computing device, each of the plurality of virtual assistants comprising at least one customized configuration for the second hardware computing device, and each of the virtual assistants being accessible by one of the plurality of users and being configured to use one or more of the virtual assistant platforms to communicate with another of the plurality of virtual assistants;
   one or more shared data stores accessible by each of the virtual assistants, the shared data stores providing the virtual assistants with shared capabilities; and
   a network topology within which the one or more virtual assistant platforms are arranged, the network topology determining parameters for communication between each of the plurality of virtual assistants.

2. The system of claim 1, wherein one or more of the shared data stores comprises a world ontology understood by all of the virtual assistants.

3. The system of claim 1, further comprising a group virtual assistant to which one or more of the virtual assistants subscribes, the group virtual assistant being configured to distribute information to the subscribed virtual assistants according to a status of each of the virtual assistants.

4. The system of claim 1, wherein the network topology is a hierarchy comprising:
   a first level preventing access to personal data of a first of the users by any of the virtual assistants that is not accessible by the first user;
   a second level comprising one or more group virtual assistants to which one or more of the virtual assistants subscribes; and
   a third level comprising one or more networks accessible by one or more of the virtual assistant platforms.

5. The system of claim 4, wherein one of the virtual assistants that is accessible by the first user is a personal virtual assistant authorized to access or modify the personal data of the first user.

6. The system of claim 4, wherein one of the virtual assistants that is accessible by the first user is a subscriber virtual assistant that subscribes to one or more of the group virtual assistants.

7. The system of claim 6, where the subscriber virtual assistant is also a personal virtual assistant of the first user, the subscriber virtual assistant being configured to communicate with other of the virtual assistants according to the first level or the second level of the hierarchy.

8. The system of claim 4, wherein one or more of the networks accessible by the virtual assistant platforms according to the third level of the hierarchy is a non-VAP-native user network.

9. The system of claim 4, wherein one or more of the networks accessible by the virtual assistant platforms according to the third level of the hierarchy is a VAP-native network.

10. The system of claim 9, wherein one or more of the VAP-native networks is an emergent network implemented by one or more of the virtual assistant platforms.

11. The system of claim 10, wherein the one or more emergent networks is accessible by only those of the users that configure one of the virtual assistants to which the user has access to participate in the third level of the hierarchy.

12. The system of claim 1, wherein the network topology is a mesh.

13. The system of claim 12, wherein:
   a first of the virtual assistants operates for a first of the users on a first of the virtual assistant platforms;
   a second of the virtual assistants operates for a second of the users on a second of the virtual assistant platforms; and
   the first virtual assistant platform and the second virtual assistant platform are configured to allow the first virtual assistant to interact with the second virtual assistant.

14. The system of claim 13, wherein:
   a third of the virtual assistants is a first group virtual assistant operating on a third of the virtual assistant platforms; and
   each of the first virtual assistant and the second virtual assistant subscribe to the first group virtual assistant.

15. The system of claim 14, wherein:
  a fourth of the virtual assistants is a second group virtual assistant operating on a fourth of the virtual assistant platforms; and
  each of the first virtual assistant, the second virtual assistant, and the first group virtual assistant subscribe to the second group virtual assistant.

16. The system of claim 1, wherein, for one or more of the users, one of the virtual assistants accessible by the user is a personal virtual assistant that is installed on an electronic device of the user and comprises a first adapter agent configured to communicate electronically with one or more sensors, such communication including receiving sensor data from the sensors.

17. The system of claim 16, wherein the one or more sensors are worn on one or more of the users' bodies.

18. The system of claim 16, wherein:
  one of the virtual assistants is a first group virtual assistant configured to process the sensor data;
  the personal virtual assistant subscribes to the first group virtual assistant; and
  the personal virtual assistant comprises a main agent configured to receive the sensor-data from the first adapter agent and transmit the sensor data to the first group virtual assistant.

19. The system of claim 18, wherein the first group virtual assistant is configured to process the sensor data by:
  comparing the sensor data to a plurality of records in one or more first databases; and
  upon matching the sensor data to one or more first results, communicating the first results to the main agent of the personal virtual assistant.

20. The system of claim 18, wherein:
  one of the virtual assistants is a second group virtual assistant configured to process the sensor data;
  the first group virtual assistant is subscribed to the second group virtual assistant and configured to send the sensor data to the second group virtual assistant; and
  the second group virtual assistant is configured to process the sensor data by, upon receipt of the sensor data, comparing the sensor data to a plurality of records in one or more second databases different from the first databases and, upon matching the sensor data to one or more second results, communicating the second results to the main agent of the personal virtual assistant via the first group virtual assistant.

* * * * *